US008803685B2

(12) United States Patent  (10) Patent No.: US 8,803,685 B2
Smith  (45) Date of Patent: Aug. 12, 2014

(54) CONTAINER DEFENSE SYSTEM

(75) Inventor: Fred Hewitt Smith, Old Town, ME (US)

(73) Assignee: Angel Secure Networks, Inc., Old Towne, ME (US)

( * ) Notice: Subject to any disclaimer, the term of this patent is extended or adjusted under 35 U.S.C. 154(b) by 1350 days.

(21) Appl. No.: 12/596,971

(22) PCT Filed: Feb. 1, 2008

(86) PCT No.: PCT/US2008/001350
§ 371 (c)(1),
(2), (4) Date: Jul. 7, 2010

(87) PCT Pub. No.: WO2008/094683
PCT Pub. Date: Aug. 7, 2008

(65) Prior Publication Data
US 2010/0295679 A1  Nov. 25, 2010

Related U.S. Application Data

(60) Provisional application No. 60/899,275, filed on Feb. 1, 2007.

(51) Int. Cl.
*G08B 13/00*  (2006.01)

(52) U.S. Cl.
USPC ............... 340/541; 340/572.1; 340/572.2; 340/572.3; 340/572.4; 340/572.5; 340/572.6; 340/10.1; 340/590; 340/600; 340/539.29; 340/539.26; 340/652; 340/679; 340/680

(58) Field of Classification Search
USPC ........................................ 340/541
See application file for complete search history.

(56) References Cited

U.S. PATENT DOCUMENTS

| 4,871,914 | A | * | 10/1989 | Simon et al. ............ 250/370.02 |
| 5,524,133 | A | | 6/1996 | Neale et al. |
| 5,642,394 | A | | 6/1997 | Rothschild |
| 7,813,540 | B1 | * | 10/2010 | Kraft ............................. 382/143 |
| 2004/0220753 | A1 | | 11/2004 | Tabe |
| 2005/0177271 | A1 | | 8/2005 | Koren et al. |
| 2005/0248454 | A1 | * | 11/2005 | Hanson et al. ........... 340/539.26 |
| 2006/0181413 | A1 | * | 8/2006 | Mostov .................... 340/539.22 |
| 2006/0285440 | A1 | * | 12/2006 | Dagher et al. ................ 367/149 |
| 2007/0003003 | A1 | * | 1/2007 | Seppi et al. ........................ 378/9 |
| 2007/0035383 | A1 | * | 2/2007 | Roemerman et al. ........ 340/10.1 |

OTHER PUBLICATIONS

International Search Report, Lee W. Young, issued Jun. 19, 2008.

* cited by examiner

*Primary Examiner* — George Bugg
*Assistant Examiner* — Anthony D Afrifa-Kyei
(74) *Attorney, Agent, or Firm* — Guntin & Gust, PLC; Ralph Trementozzi

(57) ABSTRACT

A method for scanning and securing a container including a plurality of at least partially composite panels defining an interior volume is disclosed. The method includes: storing unique identification information in an identification element within container; sealing the container; monitoring the container for intrusion; without breaching the seal of the container, remotely identifying the container based on the unique identity information without breaching the seal of the container; without breaching the seal of the container; scanning the identified container to determine the presence or absence of a nuclear weapon in the interior volume; and if the scan determines no nuclear weapon is present remotely storing certificate information associated with the identity of the container in a remote monitor unit.

23 Claims, 18 Drawing Sheets

CONTAINER DEFENSE SYSTEM

CROSS REFERENCE TO RELATED APPLICATIONS

This application is the U.S. National Stage of International Application No. PCT/US2008/001350, filed Feb. 1, 2008, which claims priority to U.S. Provisional Application Ser. No. 60/899,275, filed Feb. 1, 2007. The entire teachings of the above applications are incorporated herein by reference.

STATEMENT OF GOVERNMENT RIGHTS

This invention was made with Government support under Contract No. N66001-05-C-6014 awarded by the SPAWAR Systems Center, San Diego. The Government may have certain rights in this invention.

BACKGROUND

This disclosure relates to containers, in particular, to containers for transportation and shipping.

Based on recent domestic and foreign events, governments and the commercial sector have become concerned with the potential importing and exporting of weapons of mass destruction by terrorists or other similar organizations. By accessing a standard shipping container, a weapon such as a nuclear weapon may be placed in the container and passed undetected through a port or other import/exporting facility.

In general, approximately sixteen million twenty foot containers are in use throughout the world. Additionally, approximately 40% of the personnel that load and off-load these containers come from nations that are on the terrorist list. Bribery and sabotage are common throughout the shipping industry, including government officials, shipping companies and freight forwarders. Large quantities of contraband material now pass through maritime commerce into many ports in the US.

Most containers, including, for example, 20 foot and 40 foot dry and hi-cube shipping containers currently entering the US are made of steel. Steel is a difficult medium to scan with X-rays, since considerable energy is required to penetrate a steel wall. Substantially less energy is required to penetrate a wall made of composite material. However, composite material is typically substantially more expensive than steel. It is possible to make a container entirely from composite materials or from composite panels welded to a steel frame. A potential advantage of a composite container is that it can be manufactured so as to embed sensor grids in the composite walls, with the result that it can detect intrusions through its sides as described in U.S. Patent Publication No. 2007/0229285 filed Oct. 4, 2007 and entitled "Secure panel with remotely controlled embedded devices." However, primarily composite containers are typically substantially more expensive than a steel container.

Nuclear weapons contain fissile material. A nuclear weapon will emit radon gas and neutrons. Lead shielding will not shield radon gas and is a poor shield for neutrons. Currently available radon shielding involves an elaborate system of rubber and plastic seals. Only the United States Government has developed the technology to effectively shield radon from escaping from a nuclear weapon. It is very unlikely that a foreign adversary could produce a nuclear weapon that was shielded with lead so as to prevent the escape of gamma rays and also shielded so as to prevent the escape of radon gas and neutrons.

SUMMARY

The inventors have realized that a system featuring low power, inexpensive scanners may be used to scan composite containers for the presence of nuclear weapons and certify the containers for future shipping.

In one aspect, a system for scanning and securing a container including a plurality of at least partially composite panels defining an interior volume is disclosed, the system including: a remote control unit; a receiver unit in communication with the remote control unit; a scanner including a beam generator adapted to emit a directed radiation scan beam and a detector adapted to detect the scan beam, the scanner in remote communication with the remote control unit; a beam detector element positioned within the container adapted to detect the scan beam; an intrusion detection system positioned within the container adapted to detect an intrusion into the container; an identification element positioned within the container and adapted to store identity information indicative of the identity of the container; a transmitter element positioned within the at least one container The e beam generator is adapted to direct the scan beam along a path into the interior volume of the container through one of the plurality of at least partially composite panels, across a portion of the interior volume, out of the interior volume through one of the plurality of at least partially composite panels, and onto the scan beam detector and the scanner is adapted to determine material property information indicative of the material properties of contents of the interior volume based on the detected beam. The scanner is adapted to modulate a query message from the remote control unit onto the scan beam, and the beam detector element is adapted to demodulate the message. The identification element is adapted produce a response message based on the demodulated query message and the stored identity information. The transmitter element is adapted to transmit the response message to the receiver unit.

In some embodiments, the remote control unit is adapted to receive the response message from the receiver unit and verify the identity of the container based on the verification response message. In some embodiments, the query message includes a number generated randomly by the remote control unit.

In some embodiments the remote control unit is adapted to determine the presence or absence of a nuclear device within the container based on the material property information and, if no nuclear device is determined to be present, store a certificate associated with the container. In some embodiments, the scanner is located in proximity to the receiver unit.

Some embodiments include: a dosimeter positioned within the at least one container, the dosimeter including a radon detection element adapted to detect a radon level for the interior volume; and a neutron detection element adapted to detect a neutron level for the interior volume. The dosimeter is adapted to measure the radon level and neutron level for a period of time, compare the measured radon level to a first threshold, compare the measured neutron level to a second threshold, determine dosimeter information indicative of the presence or absence of fissile material within the interior volume based on the comparisons, and communicate the dosimeter information to one or more of the identification element, the transmitter element, the receiver element, and the beam detector element.

In some embodiments, the identification element is adapted to destroy a portion of the stored identification information in response to an intrusion detected by the security element.

In some embodiments, the identification element is adapted to destroy a portion of the stored identification information in response to a detection of fissile material within the container by the dosimeter.

Some embodiments include a verification unit including a verification scanner including a beam generator adapted to emit a directed radiation verification scan beam; and a verification receiver unit located in proximity to the verification scanner unit. The verification scanner unit is adapted to modulate a verification query message received from the remote control unit onto the verification scan beam, and direct the verification scan beam to the beam detector element located within the container. The beam detector element is adapted to detect the verification scan beam and demodulate the verification query message. The identification is adapted produce a verification response message based on the demodulated verification query message and the stored identity information. The transmitter element is adapted to transmit a verification response message to the receiver unit. The remote control unit is adapted to receive the verification response message from the receiver unit and verify the identity of the container based on the verification response message.

Some embodiments include a loading device in communication with the remote control unit and located in proximity the verification unit, the loading device adapted to selectively load the at least one container onto a transport (e.g. a ship, train or truck) based on the verification of the and the of the certificate associated with the identity of the container.

In some embodiments, the identification element stores private identification information which cannot be transmitted to any scanner or receiver located outside the container.

In some embodiments, the security element includes a sensor grid embedded in one or more of the plurality of at least partially composite panels.

In some embodiments, the container includes a sealed container having a substantially air tight interior volume, and the security element includes a radon detector unit adapted to: detect the change in radon level in the interior volume of the sealed container; compare the detected change to an expected change value based on the four day half life of radon; and indicate the presence or absence of an intrusion into the sealed container based on the comparison.

Some embodiments include a first scanner adapted to produce a relatively low energy directed radiation scan beam; a second scanner adapted to produce a relatively high energy directed radiation scan beam; and a sorting module adapted to direct containers represented to contain substantially no metal material to the first scanner and to direct containers represented to contain metal material to the second scanner. The first scanner is adapted to receive a container represented to contain substantially no metal material from the sorting module, and to scan the container to verify that substantially no material is present inside the container. The second scanner is adapted to receive a container represented to contain metal material from the sorting module, and to scan the container to detect the presence of a nuclear device. Some such embodiments also include a third scanner adapted to produce a relatively moderate energy directed radiation scan beam. The sorting module is adapted direct containers represented to contain metal material which has a density above a threshold value to the second scanner, and to direct containers represented to contain metal material consisting only of metal material having a density below the threshold value to the third container. The third scanner is adapted to receive a container represented to contain metal material consisting only of metal material having a density below the threshold value from the sorting module, and to scan the container to verify that substantially no material is present inside the container having a density above the threshold value.

In some embodiments, the scanner and the receiver unit each include an information security element adapted to prevent access to data stored in the scanner and the receiver unit by an entity other than the remote control unit.

In another aspect, a method for scanning and securing a container including a plurality of at least partially composite panels defining an interior volume is disclosed, the method including: storing unique identification information in an identification element within container; sealing the container; monitoring the container for intrusion; without breaching the seal of the container, remotely identifying the container based on the unique identity information without breaching the seal of the container; without breaching the seal of the container; scanning the identified container to determine the presence or absence of a nuclear weapon in the interior volume; and if the scan determines no nuclear weapon is present, remotely storing certificate information associated with the identity of the container in a remote monitor unit.

In some embodiments, the storing unique identification information in an identification element within container includes: at a secure trusted location, providing identification information to be stored in the identification element positioned within the container, the identification information including a public ID portion and a corresponding secret ID portion, and storing a copy of the public ID and the private ID in the remote monitor unit.

In some embodiments, remotely identifying the container includes: at a first location, providing the remote monitor unit; at a second location providing a scanning unit in communication with the remote monitor unit, the scanning unit adapted to communicate with the identification element within the container without breaching the seal of the container; generating query information at the remote monitor unit; transmitting the query information to the remote scanning unit; without breaching the seal of the container transmitting the query information from the remote monitor to the identification element; at the identification element, using a hash algorithm to hash the query information with the private ID to produce response hash information; in response to the query information, without breaching the seal of the container, transmitting the public ID stored in the identification element and the response hash information to the scanning unit transmitting the public ID stored in the identification element and the response hash information from the scanning unit to the remote monitor unit; and at the remote monitor unit: identifying the private ID corresponding the public ID received from the scanning unit; using the hash algorithm to hash the query information with the identified private ID to produce verification hash information; comparing the response hash information to the verification hash information to verify the identity of the container.

Some embodiments include, in response to an intrusion of the container, modifying or destroying at least a portion of the identification information.

In some embodiments, the scanning includes: generating a directed radiation scan beam having a beam energy sufficient to penetrate through at least one of the plurality of composite panels but insufficient to penetrate through bulk metal material; directing the scan beam along a path into the interior volume of the container through one of the plurality of at least partially composite panels, across a portion of the interior volume, out of the interior volume through one of the plurality of composite panels, and onto a scan beam detector; detecting the scan beam with the scan beam detector, analyzing the detected beam to determine information indicative of the material properties of contents of the interior volume based on the detected beam; and outputting the information indicative of the material properties of contents of the interior volume.

Some embodiments include using a dosimeter positioned within the container to measure the radon level and the neutron level in the interior volume over a period of time, detecting the presence or absence of fissile material within the interior volume based on the measured radon level and neutral level; in response to a detection of fissile material, destroying a portion of the identification information stored in the identification element.

Some embodiments include monitoring the container for an indication of an imminent nuclear explosion, and in response to a detection of an imminent nuclear explosion, transmitting a message including information indicative of the identity of the container.

Various embodiments may include any of the above described features, alone or in any combination. These and other features will be more fully appreciated with reference to the following detailed description which is to be read in conjunction with the attached drawings.

In is to be understood that, as used herein, the term "detecting a beam" and related terms refer to detecting any property of a beam of radiation (e.g. an x-ray beam) including, but not limited to: intensity, fluence, cross section, wavelength, pulse duration, etc. Further, it is to be understood that detecting a beam may include detecting the interruption or blocking of a beam (e.g. when an x-ray beam is blocked by metallic material positioned between the beam source and the detector).

BRIEF DESCRIPTION OF THE DRAWINGS

The foregoing and other objects of this disclosure, the various features thereof, may be more fully understood from the following description, when read together with the accompanying drawings in which.

DETAILED DESCRIPTION

The following discloses a system 10 for scanning shipping containers (e.g. maritime containers) for the presence of a concealed nuclear weapon before the container is loaded onto transport, e.g. a ship bound for the US from a foreign nation. System 10 is an inexpensive automated defense which will allow commerce to flow rapidly. An inexpensive automated defense can be widely deployed, with the result that it may become financially and operationally feasible to scan 100% of containers entering the US.

Figure 1:
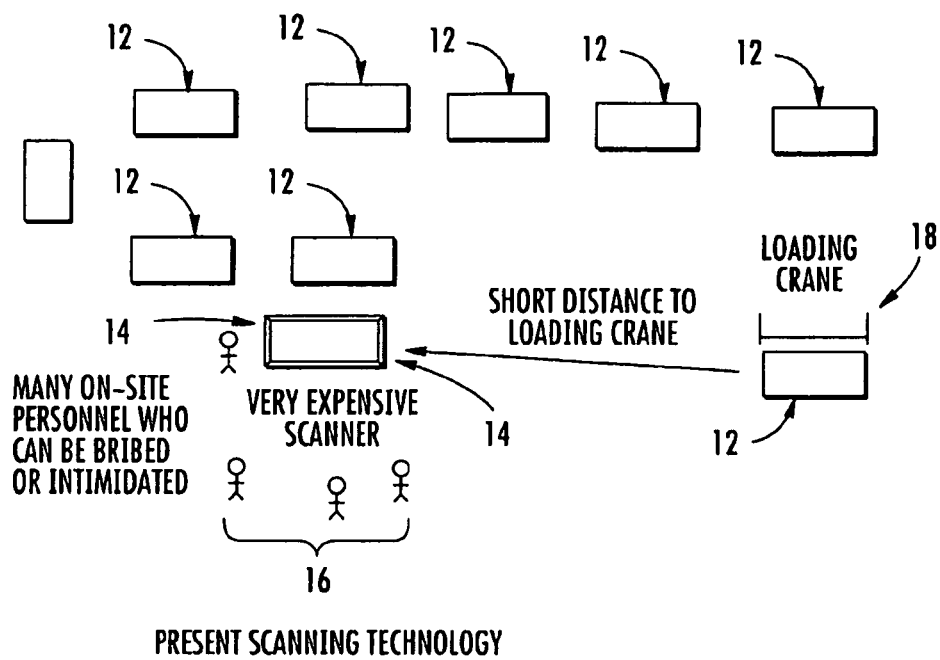
FIG. 1 illustrates a prior art container scanning system.

FIG. 1 depicts the current scanning methods, where many containers 12 line up to pass through a very expensive high power x-ray scanner 14. Numerous on-site operators 16 are required and they must be trusted in order for the system to work. This method is so slow and so expensive that most containers 12 are not scanned, even though 100% scanning of inbound containers will be required a few years from now, according to recent federal legislation. The scanning operation has to be close to loading crane 18, since there is no procedure except physical control to assure that the container is not breached after scanning and prior to loading.

Figure 2:
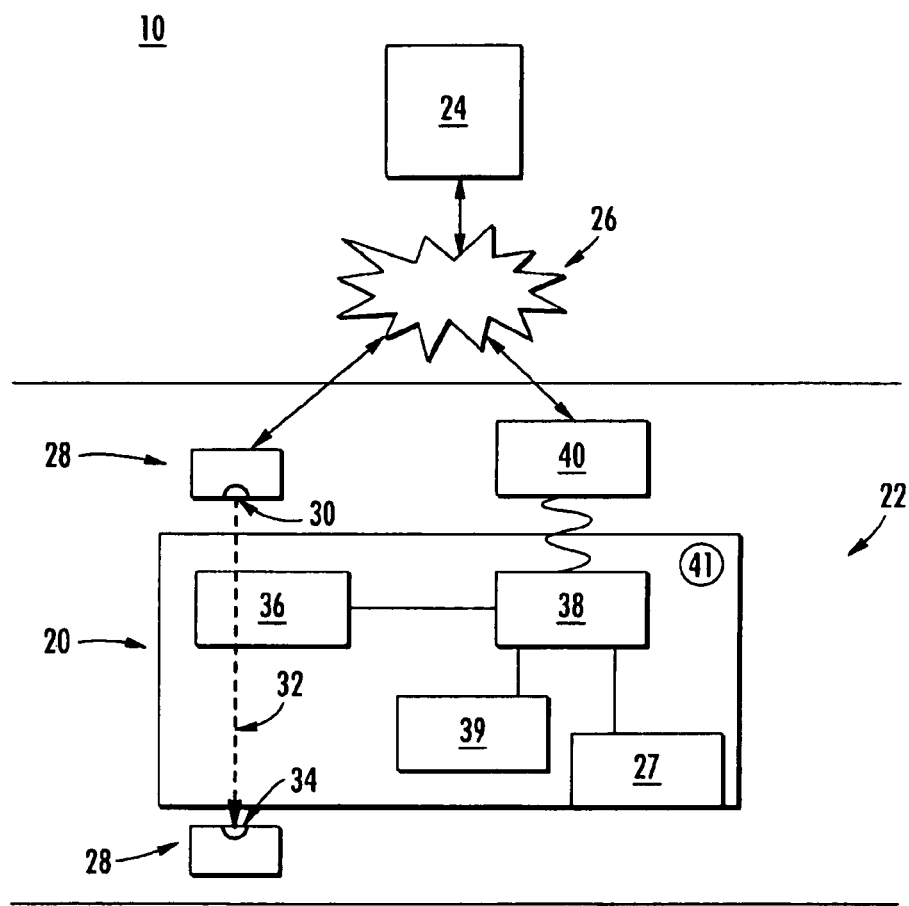
FIG. 2 illustrates a system for scanning and certifying containers.

Referring to FIG. 2, system 10 is a system for scanning shipping containers 20. System 10 includes one or more scanning lanes 22. Remote monitor unit 24 is in communication with scan lane 22 over the internet 26 (or other suitable communication link or network).

Container 20 is constructed from multiple panels defining an interior volume. The panels may be entirely or partially constructed from composite material which has relatively high transmissivity to x-ray radiation compared to conventional container panel materials (e.g. steel).

Container 20 includes a security element 27 which monitors the container for breach or intrusion. For example, as described in detail below, one or more of the panels of container 10 may be composite panels embedded with a multitude of electrically or optically interconnected sensors which can detect a breach in the panel.

Scanner 28 includes beam generator 30 which transmits a directed radiation scan beam 32 (e.g. an x-ray beam) along a path through a composite portion of a sidewall of container 20, across a portion of the interior volume, and out through a composite portion of the opposing sidewall and onto scan beam detector 34 position the other side of the container.

Because scan beam 32 is directed through composite portions of container 10 having relatively high transmissivity, beam generator 30 may have relatively low power (and hence low cost) beam source. As described in detail below, signals from scan beam detector 34 may be analyzed to determine information about the material properties of cargo (not shown) located in the interior volume of container 10. For example, blockage of the beam might indicate the presence of dense material such as metal. Using the techniques described below, scanner 28 can operate to scan the entire contents of container 10 to determine the presence of a nuclear weapon.

Scanner 28 is in communication with remote monitor unit 24. Signals from scan beam detector 34 and/or analyzed data indicating, e.g., the presence or absence of a nuclear weapon within container 10 may be transmitted to remote monitor unit 24. Scanner 28 can operate to modulate a message received from the remote monitor unit onto scan beam 32.

Scan beam detector/demodulator located inside container 10 can detect scan beam 32 and demodulate a message modulated onto the beam. In some embodiments, detector/demodulator 36 may also function to modulate additional messages onto scan beam 36 which can be detected and demodulated by scan beam detector 34 after scan beam 32 exits container 20. In this fashion, a one or two way directed beam communication link may be established with detector/demodulator 36.

Detector/demodulator 36 is in communication with identification element 38 which includes an electronic memory capable of, as described in more detail below, storing information including electronic IDs and other data. Identification element 38 may also include a processor capable of processing the stored data. Identification element 38 also includes a non-directed wave transmitter (e.g. a radio transmitter, RF transmitter, Bluetooth antenna, etc) which transmits messages based on the stored data. Identification element 38 is also in communication with security element 27, which, upon detecting a breach of container 10, may cause identification element 38 to modify or destroy the stored electronic ID and/or other data.

Receiver 40, positioned in or near scanning lane 22, can receive the non-directed transmissions from identification element 38. For example, receiver 40 may be a laptop or personal computer. Receiver 40 is in communication with remote monitor unit 24 via the internet 26.

Dosimeter 39 is positioned inside container 10, and may be in communication with one or more of identification element 38, security element 27, and detector/demodulator element 36. As described in detail below, dosimeter 39 can detect the presence of even lead shielded fissile material located inside container 20.

In some embodiments, if fissile material is detected, dosimeter 39 can produce an alarm which causes cause identification element 38 to modify or destroy the stored electronic ID, certificates, and/or other data.

Explosion detector 41 is positioned inside container 20, and operates to detect the presence of an imminent nuclear explosion (e.g. by detecting x-rays, gamma rays, neutrons, thermal emissions, etc.). Explosion detector 41 can transmit a warning message which includes information indicating the identity of the container. Thus, in the event of a system failure leading to a nuclear explosion, the source of the explosion can be more easily tracked.

The following will describe how system 10 will scan container 20 for the presence of a nuclear weapon, and present the container with a certificate certifying that it has been scanned. As described below, such a certificate can be secured so that it can be trusted when presented at a later time and position, e.g., at the loading crane which loads container 10 onto a transport.

Container 10 is driven into scanning lane 20 analogous to the lanes in a highway toll booth. Scanner 20 modulates a query message onto scan beam 32 which is detected and demodulated by detector/demodulator element 36. In response to the demodulated query message, identification element 38 transmits a response message including stored identity data via Bluetooth to receiver 40, which passes the response message via the Internet to remote monitor unit 24.

Remote monitor unit 24 generates a token (e.g. a random number) and sends it to scanner 28. Scanner 28 modulates the token over scan beam 32. Detector/demodulator 36 detects the scan beam, demodulates the token from the beam, and communicates the token to identification element 38, which sends the token back to receiver 40 via Bluetooth. Receiver 40 sends the token via the Internet back to the remote monitor.

After the transmission and receipt of the token described above, remote monitor unit 24 can verify (e.g. using a look up list of electronic IDs installed in various containers at a secure production facility) that the container associated with the electronic ID produced by identification element 38 is in fact container 10 which is physically present in lane 20 in front of scanner 28. This assurance permits secure remote management of the scan itself.

Using the techniques described herein, scanner 28 scans container 20 for the presence of a nuclear weapon. If the container passes the scan, scanner 28 sends a certificate to remote monitor unit 24, which stores it. This certificate associates the container's ID with the fact that the container passed the scan. In some embodiments, dosimeter communicates information regarding the presence of fissile material with scanner 28 and receiver 40, which may be passed on to remote monitor unit 24. The issuance of the certificate may be based on this information.

After leaving scanning lane 20, when the container is presented for loading by the loading crane, one need only obtain the ID of the container, communicate with the remote monitor, and determine if this container has been issued a certificate certifying that it has passed a scan.

For example, a loading crane may pick up container 10. Through a PC built into the loading crane, remote monitor 24 communicates with identification element 38 in the container to obtain electronic ID information, determines whether the ID is valid and whether a scanning certificate has been issued. If the ID is valid and there is a scanning certificate, the remote monitor instructs the loading crane to load the container on board the ship. In typical applications, this entire procedure takes less than a second. If there is an invalid ID or no certificate, the crane would deposit the container in a secure area for containers that need to be examined by the proper authorities. The process of how the validity of an ID is determined is described in detail below.

Identification element 38 stores a public and a private ID. In response to a query (e.g. modulated over a scan beam and demodulated by detector/demodulator element 36), identification element 38 sends a public ID to remote monitor unit 24, e.g. via a Bluetooth receiver linked via the internet to the monitor. Remote monitor unit 24 then generates a question, which it sends to identification element 38 (e.g. via a scan beam). The identification element 38 transmits an answer to the question which is received and returned to remote monitor unit 24. The question remote monitor unit 24 sends is a randomly generated number (e.g. a 32 bit number). Using a hash algorithm of the type familiar to those in the art, identification element 38 prepares a response hash of this number and the stored hidden ID, and returns this response hash value, the answer, to remote monitor unit 24. Using the same algorithm, remote monitor unit 24 prepares a verification hash of its copy of the hidden ID associated with the public ID presented by identification element 38. If the response and verification hashes are identical, the probability that identification element 38 locate in container 10 does not contain the correct hidden ID is near zero. Note that, since the question is generated randomly, identification element 38 is almost certainly never asked the same question twice. If container 10 is asked the same question twice, identification element 38 will realize this, and will alarm. Only an identification element 38 that has the correct hidden ID will answer these randomly generated questions with the answer that is correct for a particular question.

Using the presented public ID, remote monitor unit 24 can look up the private ID that the identification element 38 should possess. Using the question, the answer, and the correct private ID stored with the remote monitor, the remote monitor can determine whether identification element 38 actually does possess this ID. Using this type of procedure, remote monitor unit 38 can determine whether identification element 38 possesses a certain ID without ever having to transmit the secret portion of the ID outside identification element 38.

As described above, security element 27 and dosimeter 39 may operate to modify or destroy the hidden ID in response to detection of intrusion/tampering and the presence of fissile material, respectively. Accordingly, the identification process described above can also be used to identify containers subject to tamper or containing hidden fissile material.

The above described procedure for testing the secret ID is used both during the scanning of container 20 in scan lane 22 and when the container is presented for loading.

Referring again to FIG. 2, container 20 should pass a scan and be issued a certificate if (a) no dense metal is detected; (b) the container has a valid ID; and (c) dosimeter 39 does not detected hidden fissile materials About one third of all in-bound US containers will contain dense metal, and so for these containers, condition (a) will not be met. For these containers it is possible to issue a certificate on the basis of conditions (b) and (c). In other words if dosimeter 39 has not detected fissile material and the container has a valid ID, the container should be issued a certificate for loading.

There are many reasons why container 20 would not have a valid ID. One reason is that the container had never been issued at ID. Issuance of IDs is discussed below. Another reason that container 20 would not have a valid ID would be detection of some type of an alarm condition. When an alarm condition is detected, identification element 38 destroys part of the ID so that the container cannot thereafter present a valid ID. Alarm condition could include a breach through the sides of a container detected by security element 27, an attempt to reverse engineer identification element 38, detection of fissile material by dosimeter 39; detection of an air change by dosimeter 39 (described in detail below).

Figure 3:
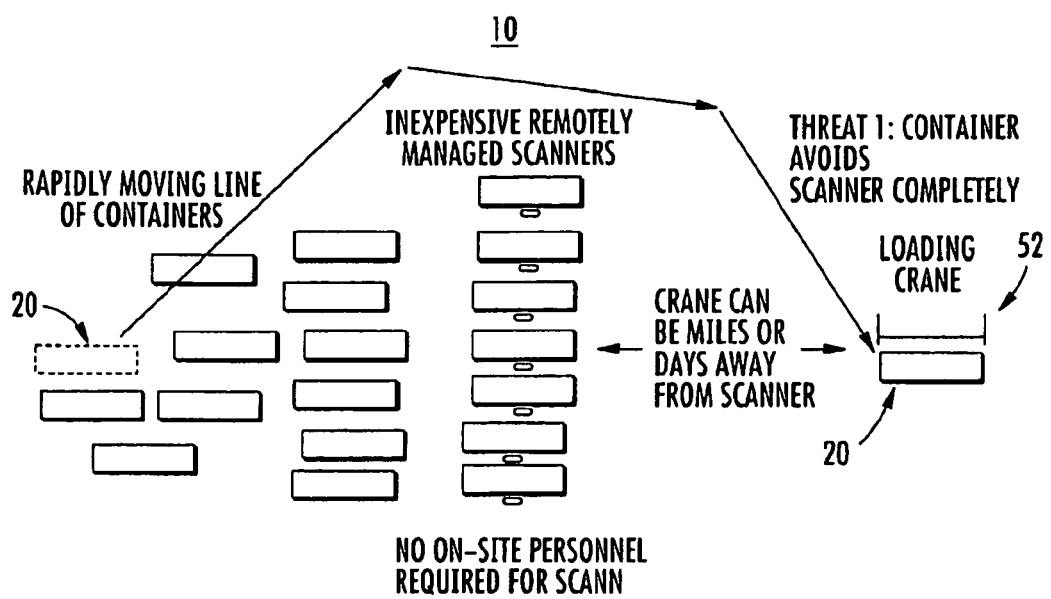
FIGS. 3-6 illustrate potential attacks on a system for scanning and certifying containers.

The following describes various possible attacks against the system 10, and how system 10 defeats the threat. FIG. 3 illustrates a threat presented when a container 20 which has never been scanned is presented for loading at crane 52. Following the procedures described above, when container 20 arrives at the loading dock crane 52, remote monitor 24 (not shown), using a scanner located at or near crane 52, attempts to communicate with the identification element which should be inside. If the remote monitor cannot do this, the container is not loaded.

If remote monitor unit 24 can communicate with an identification element in container 20, remote monitor 24 will check to determine if the ID stored in the identification element is valid. If the ID is valid, remote monitor 24 will verify that a container with this ID has been scanned (e.g. by searching for a certificate associated with the container). In the illustrated threat in this section, the container has not been scanned, there will be no certificate, and container 20 will not be loaded.

Figure 4:
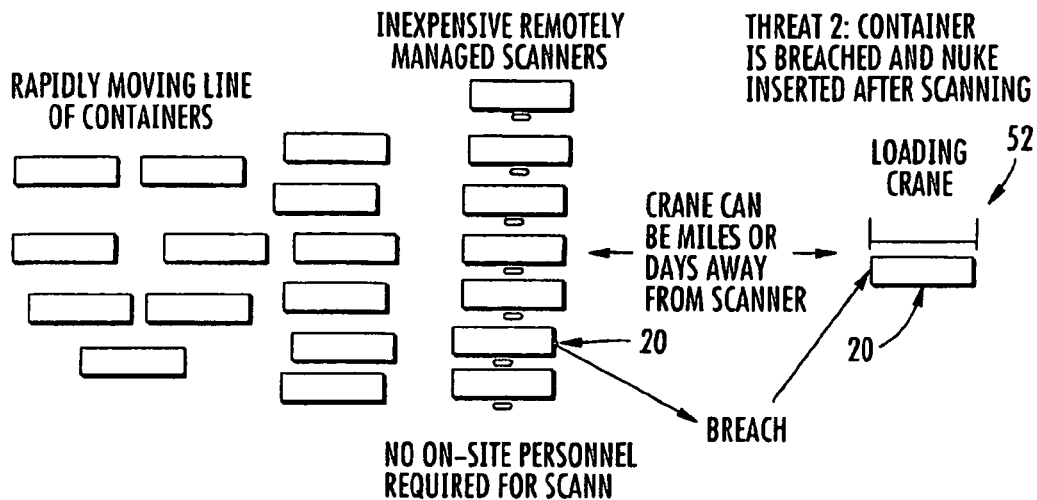

FIG. 4 illustrates an attack, whereby after container 20 has passed a scan and been issued a certificate, but before being presented for loading at crane 52, an adversary breaks into container 20 and inserts a nuclear weapon. The defense involves detecting the attack, and upon detection destroying part of the hidden ID in identification element 38. If the data including the hidden ID is destroyed, identification element 38 will not be able to correctly answer the question posed by remote monitor 24, and the container will not be loaded.

As discussed in detail below, security element 27 can detect a breach through the walls of the container. Security element 27 is connected to identification element 38. When the identification element 38 is alerted that the container has been breached, it destroys a part of the private ID as described above. When container 20 is later presented for loading at crane 52, the container will not pass a question and answer interrogation. This will mean that something is wrong and the container should not be loaded.

In some embodiments, identification element 38 consists of a circuit embedded into a composite material. This circuit contains numerous electronic elements which store the values which make up the ID. Destroying one of these elements will cause the identification element 38 to fail the question and answer dialogue with remote monitor 24.

When identification element 38 destroys part of the ID by destroying an electronic element, it does not merely electronically erase the information from the element, but chemically or thermally destroys the element so that the element can never be made to reveal its prior contents. An adversary with advanced technology can sometimes recover a number which has been erased using simple electronic methods. A composite material is superior to silicon as a substrate for an electronic circuit, because data destruction functionality is difficult to implement in silicon.

Figure 5:
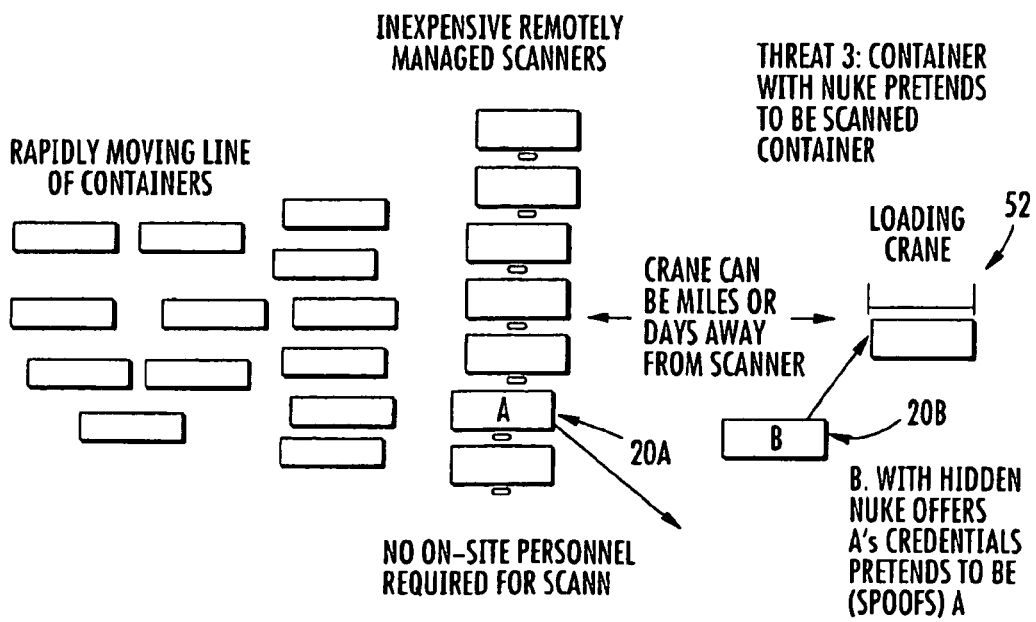

FIG. 5 illustrates the threat of spoofing attack. For this attack an adversary produces two containers 20A and 20B each including an identification element 38 storing the same ID. Container 20A is scanned and contains no harmful material. Container 20B has the nuclear weapon and is not scanned. Container 20B is then presented to loading crane 52. Since both containers have the same ID, the loading crane 52 believes container 20B is container 20A. An adversary can practice this attack with harmless merchandise. When the adversary is certain that the spoofing operation works properly, the adversary can commit a nuclear weapon to the importation process with low risk that the weapon will be discovered and lost and that an alarm will be sounded.

System 10 defends against this threat by assuring that no two containers can have the same ID and that an adversary cannot discover the ID of the container. An ID embedded in a silicon chip can be discovered by a sophisticated adversary using the Focused Ion Beam System (FIBS) which takes a silicon chip apart molecule by molecule. FIBS reverse engineering services are readily available on the market.

In some embodiments, identification element 38 represents a defense against FIBS. Identification element 38 may be a circuit embedded not into silicon but into composite material whereby the elements are widely dispersed and continuously check on one another. When attack is sensed, identification element 38 permanently destroys various elements of the ID by burning or chemical methods so that the previous value of the element cannot be recovered, even by a sophisticated adversary.

Also, as previously described above, the identification element 38 uses a question and answer procedure whereby the presence of a particular ID can be remotely detected without ever having to send the ID itself over the internet or other long distance public channel.

Figure 6:
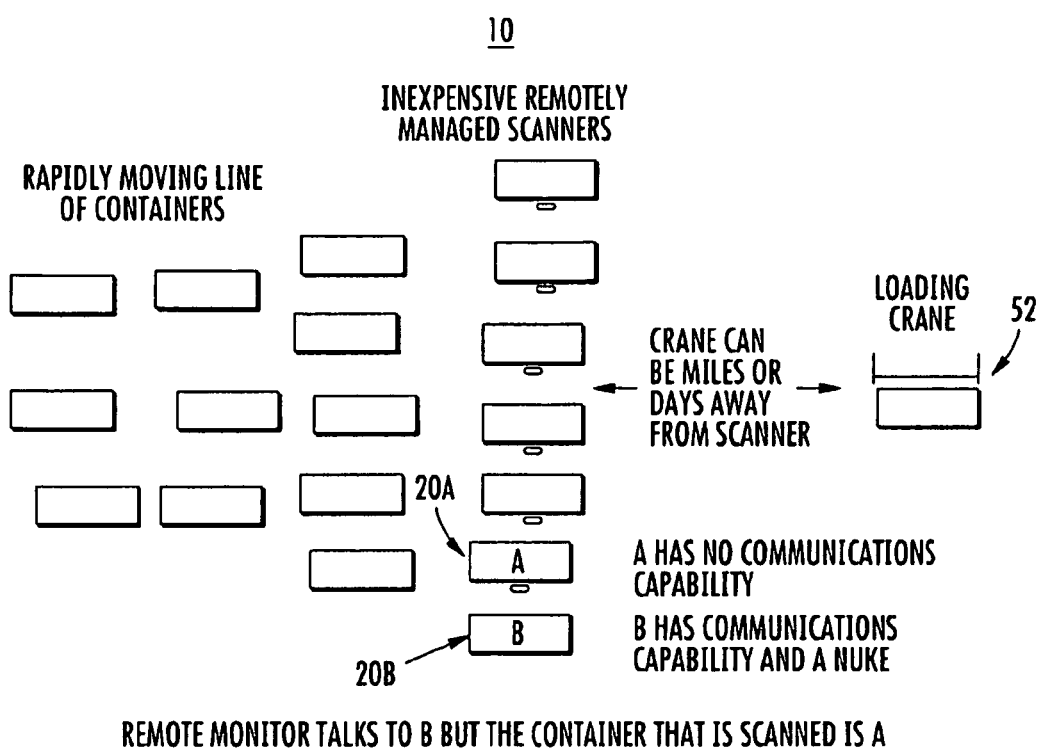

FIG. 6 illustrates an attack where an adversary attempts to fool the scanner so that one container 20A is scanned whereas another container 20B provides the ID. System 10 defends against this threat using the closed loop identification techniques described herein to verify that the container in communication with remote monitor 24 is actually located in the appropriate scan lane 22 in front of scanner 28

In such techniques, information is exchanged over a directed X-ray or microwave or other wave by modulating and demodulating the information using well-known technology. Of course this exchange of information may be encrypted. A sophisticated adversary could possibly intercept the exchanged information and defeat the protection using a variation of the man-in-the-middle attack, whereby the scanner believes it is communicating with the container, and the container believes it is communicating with the scanner, but in fact both are communicating with an adversary that has been interposed between them. System 10 may employ methods to detect a man-in-the-middle attack known in the art.

Attacks involving placing a hidden shielded nuclear weapon in container 20 may be defeated by system 10 by employing a dosimeter of the type described in detail below.

There is a possibility an adversary could attempt to discover the ID embedded in identification element 38 by bribing or intimidating employees in the factory where the ID is installed.

When the ID is installed in identification element 38 in container 20, it is generated by remote monitor 24 and transferred over the Internet to the factory for installation into identification element 38. This is the only occasion when the ID travels over the Internet and when it exposed outside the remote monitor.

As described above, after this time, the remote monitor queries identification element 38 to determine if the element has a particular ID, but this procedure does not involving actually communicating the ID outside of identification element 38.

For the initial transfer, the ID is encrypted using secure methods involving asymmetric and symmetric encryption methods. Under this procedure, identification element 38 will generate an asymmetric public/private key pair, send the public key to the remote monitor, which generates a symmetric key and encrypts that key with the public key, and returns the encrypted symmetric key to the identification element 38, which uses the private key to decrypt the symmetric key. The symmetric key is now used to encrypt the ID elements.

Using the above technique, system 10 can protect the ID elements when they are installed at the factory. The factory manufacturing identification element 38 itself would also be physically secure and could be located inside the United States.

There is a possibility that an adversary could bribe or intimate a trusted employee working at a remote site (e.g. scan lane 22) so as to obtain container IDs. This employee might be so trusted that the employee was given "root" or administrative access, meaning the employee was authorized to perform system maintenance tasks. To avoid this, security techniques may be employed to prevent access to critical data, including for example, limiting the availability of certain sensitive operating system functions and/or deleting, modifying, or destroying the critical data when the use of certain sensitive operating system functions are detected.

Figure 7:
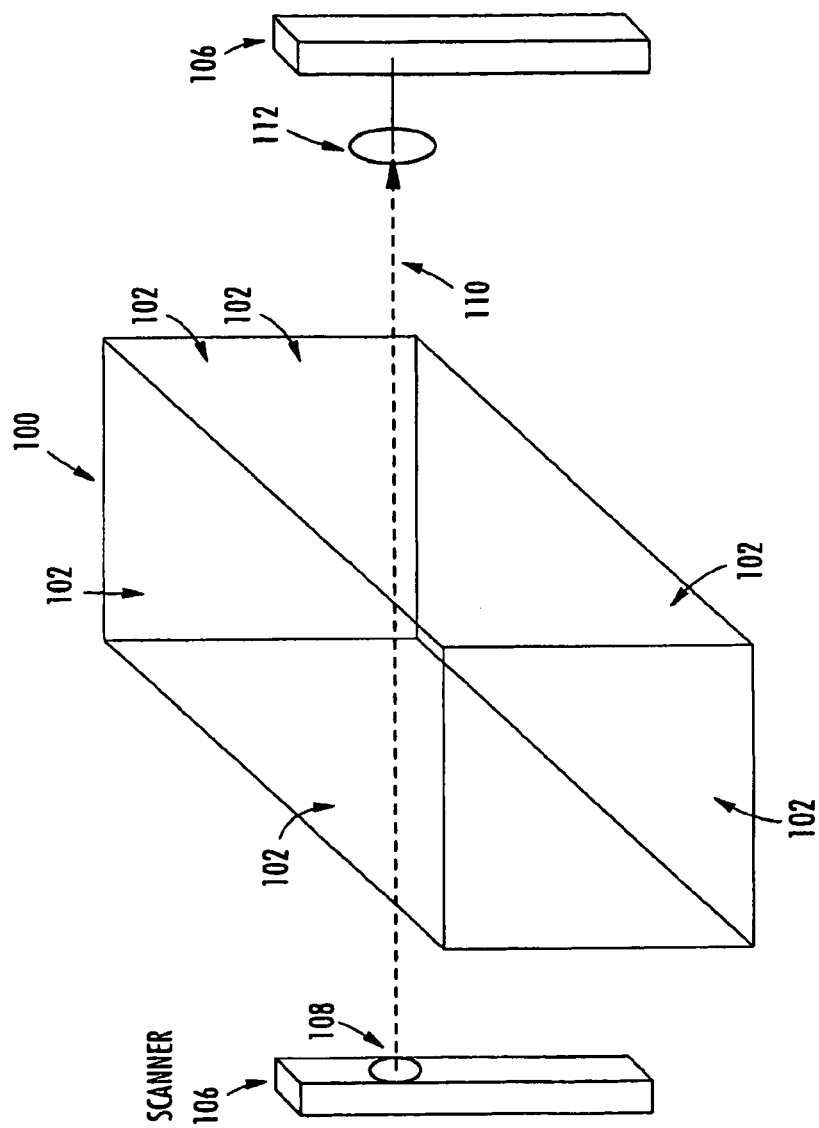
FIG. 7 shows a perspective view of a container and a scanning system.

In various embodiments, system 10 may feature any of the following elements and techniques, alone or in combination.
Composite Container Scanner and Triage System Referring to FIG. 7, container 100 is constructed from composite panels 102 enclosing an interior volume. Scanner 106 includes directed radiation beam emitter source 108 which produces scan beam 110. Scan beam 110 is directed along a path which travels through a side panel 102 of container 100 into the interior volume, across a portion of the interior volume, out of opposing side panel 102, and onto detector 112. Scanner 106 includes directed x-ray beam emitters 108. A detector signal from detector 112 is transmitted to a remote control unit (not shown), and analyzed to determine the material properties of cargo (not shown) loaded in the interior volume of container 100. For example, the detector signals can be analyzed to determine the presence of metals, fissile material, medium density material (e.g. electronic components), etc. In some embodiments detector 110 may be in communication with a local analyzer, such as a personal computer or laptop.

In the illustrated embodiment, where container 100 is a rectangular parallelpiped, scan beams 110 and their respective emitters 108 and detectors 112 are along axes parallel to one of the sidewalls of container 100. In some embodiments, beams 110 and their respective emitters 108 and detectors 112 may be angularly offset with respect to the container sidewall.

Because panels 102 are made of composite material having relatively high transmissivity (e.g. in comparison to metal, such as steel), scan beam 110 need not be a high energy beam. Accordingly emitter 108 may be an inexpensive, relatively low power beam emitter. For example, emitter 108 may have sufficient power to penetrate composite panels 102 and low density, non-metal cargo loaded into the interior volume of container 100, but insufficient power to penetrate dense, bulk metal (e.g. steel, lead, fissile material) etc. In such a case, an interruption of scan beam 110 measured by detector 112 would indicate the presence of dense metal material in the interior volume.

In various embodiments, emitter 108 may be low-voltage x-ray source (e.g. a 200 kV or less x-ray source) or a cobalt-60 x-ray source. A scanner including such a source could be manufactured at a cost of about $10,000 or less. In contrast, to generate a scan beam with sufficient energy to penetrate a steel container would require a high voltage x-ray source operating at 3000 kV or more.

Figure 8:
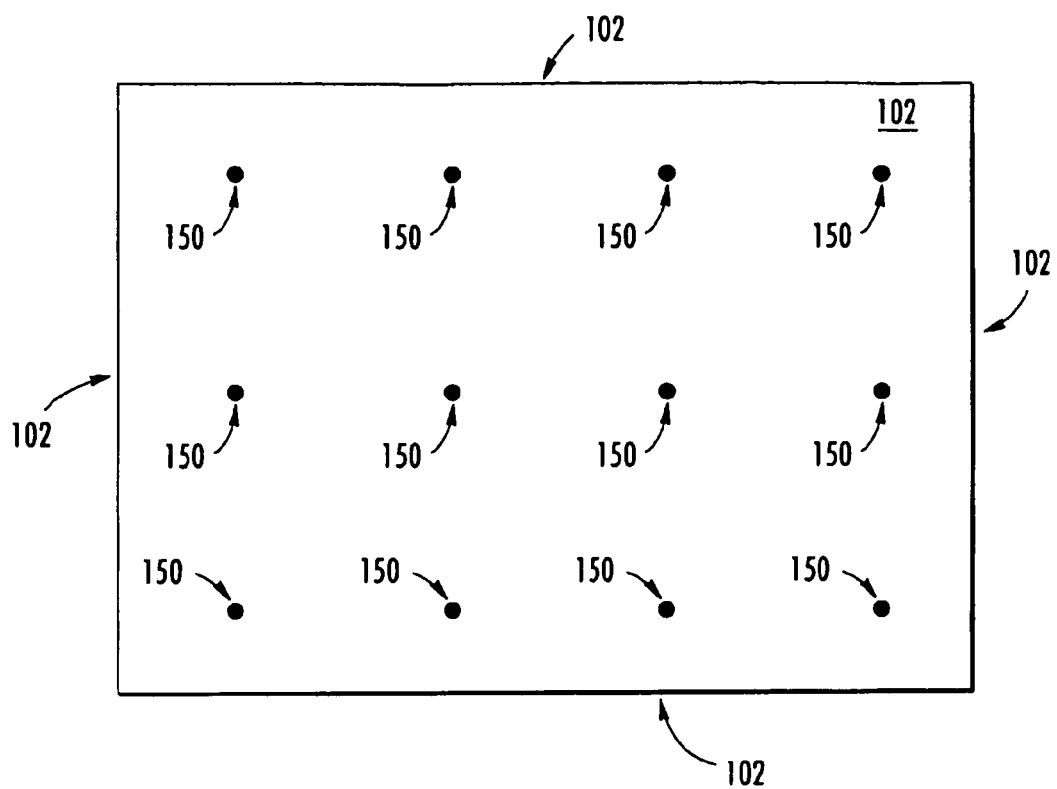
FIG. 8 illustrates a scanning pattern on a container panel.

Container 100 can be moved relative to scanner 108 and detector 112 (e.g. by driving a truck hauling the container past scanner 106) to allow scan beam 110 to be directed through additional points on side panel 102 such that additional portions of the interior volume are scanned. Alternatively, scanner 108 and detector 112 may be moved relative to container 100 to scan different portions of the interior volume. For example, referring to FIG. 8, a scan could sample data points for scan beams directed through points 150 on side panel 102 located every six inches vertically and horizontally. For example, for a 20 foot by 5 foot panel a total of (40*10)=400 data points might be sampled, with each data point indicating the presence or absence of metal along the scan beam passing through a given point. The results of this scan may be analyzed and compared to a threshold to determine the presence of, for example, a nuclear device. For example, if less than 30 of the 400 data points in the example above showed the presence of metal, it may be determined that the container does not contain a nuclear weapon with a probability of error of 1 part in 1 trillion. The 400 point data sample will be compressible into a computer file size of 40 bytes, allowing easy storage or transmission to, for example, a remote monitoring or control unit.

In some embodiments, scanner 106 may contain multiple emitters: 108 which may produce multiple scan beams 110 simultaneously or sequentially. As described in greater detail below, in some embodiments only select portions of one or more of panels 102 of container 100 consist of composites with the remainder being made up of metal (e.g. steel). The composite portions allow scan beam 110 to access the interior volume of the container.

As will be discussed in greater detail below, in some embodiments it is possible to place a detector inside a shipping container 100 that could detect a scan beam 110. With an appropriate detector, messages could be modulated over the scan beam and demodulated by the detector, so that the scanner could communicate with the detector inside the container. Such communication capability could be useful for a remote monitor to communicate (e.g. using wireless, radio, or Bluetooth links) with a sensor or identification elements inside the container and also to communicate with the same container over the scan beam. This would allow remote assurance that the container in front of the scanner was the same container that was in communication with the remote monitor.

Approximately 66% of container traffic inbound to the West Coast of the US is volume limited. Of this traffic, half contains no metal (i.e. clothing and shoes), a quarter contains electronic parts and games, and the remainder contains other goods such that a full 20 ft. container weighs less than the maximum weight of 67,200 lbs. A scanner slightly more powerful than the type of scanner discussed above could be built that would penetrate a cargo consisting of light electronic goods but would be blocked by dense metal. A nuclear weapon will contain dense metal, even if not shielded with lead. If shielded with lead, it will be even denser. Consequently, 33% of the inbound West Coast Cargo traffic could be scanned with an inexpensive scanner and declared not to contain metal, provided the cargo were transported in a composite container. On the assumption that if a container does not contain metal, it does not contain a nuclear weapon, 33% of the inbound container traffic to the West Coast can be inexpensively scanned and declared safe.

In the following, an exemplary scanning and triage system is disclosed for efficiently scanning multiple at least partially composite containers for the presence of a hidden nuclear device.

Figure 9:
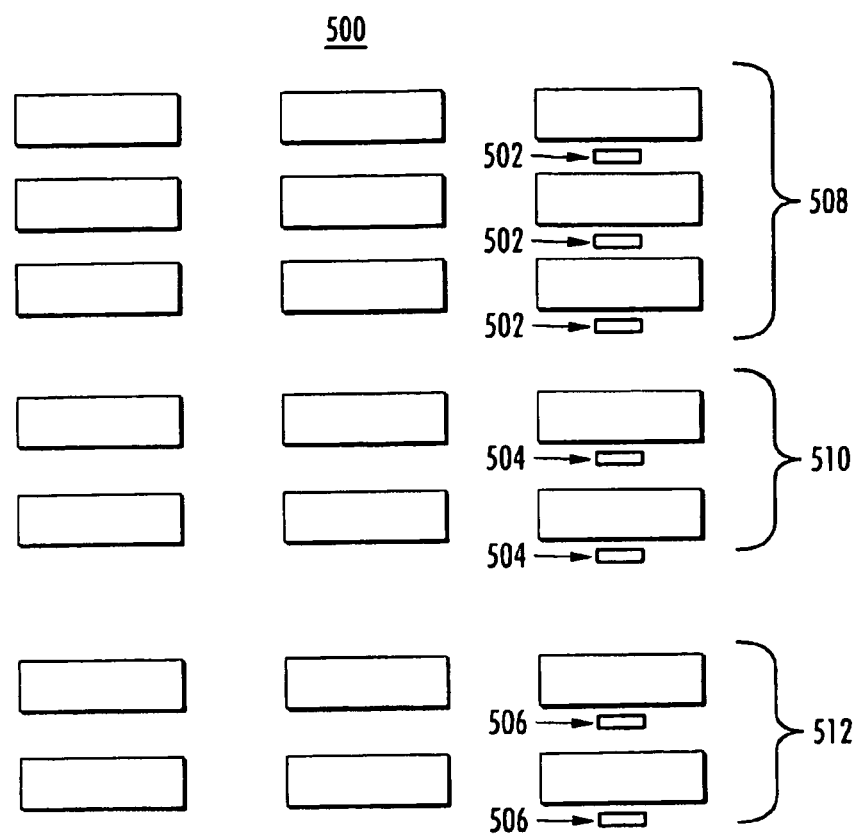
FIG. 9 illustrates a triage and scanning system.

Referring to FIG. 9, system 500 includes one or more low power scanners 502 having a scan beam with insufficient energy to penetrate dense metals or medium density partially metallic material (e.g. electronic components). The system also includes one or more medium power scanners 504 having a scan beam with insufficient energy to penetrate dense metals but sufficient energy to penetrate medium density partially metallic material (e.g. electronic components). The system also includes one or more high power scanners 506 having a scan beam with sufficient energy to penetrate dense metals.

Any of scanners 502, 504, 506 could be coupled with a data collection program on a lap top or remote monitoring unit which analyzes scan data using one or more of the techniques described above to determine information about the content of the containers.

Containers 508 that are represented as containing non-metallic low density material such as clothing are directed to low power scanners 502. Containers 508 which pass this scan (i.e. if no metal is detected in the container) are declared not to contain a nuclear weapon. These containers would not have to be scanned by a more powerful and more expensive scanner. Approximately one third of in-bound container traffic in the U.S. is of this type. This will save money in scanning equipment and delay.

Containers 510 that are represented as containing electronic components or other medium density cargo are directed to the medium power scanners 506 suitable for this type of cargo. Containers 510 which pass this scan (i.e. if no metal having a density greater than that typical of medium density cargo is detected) are declared not to contain a nuclear weapon. These containers would not have to be scanned by a more powerful and more expensive scanner. Approximately one third of in-bound container traffic is medium density. This will save money in scanning equipment and dock delay.

Containers 512 that are represented as containing high density metallic material are directed to high power scanners 512. These scanners can scan the containers for nuclear weapons using, for example, high energy x-ray scanning techniques known in the art. Containers 512 which pass this scan (i.e. if no metal having a density greater than that typical of medium density cargo is detected) are declared not to contain a nuclear weapon.

Figure 10:
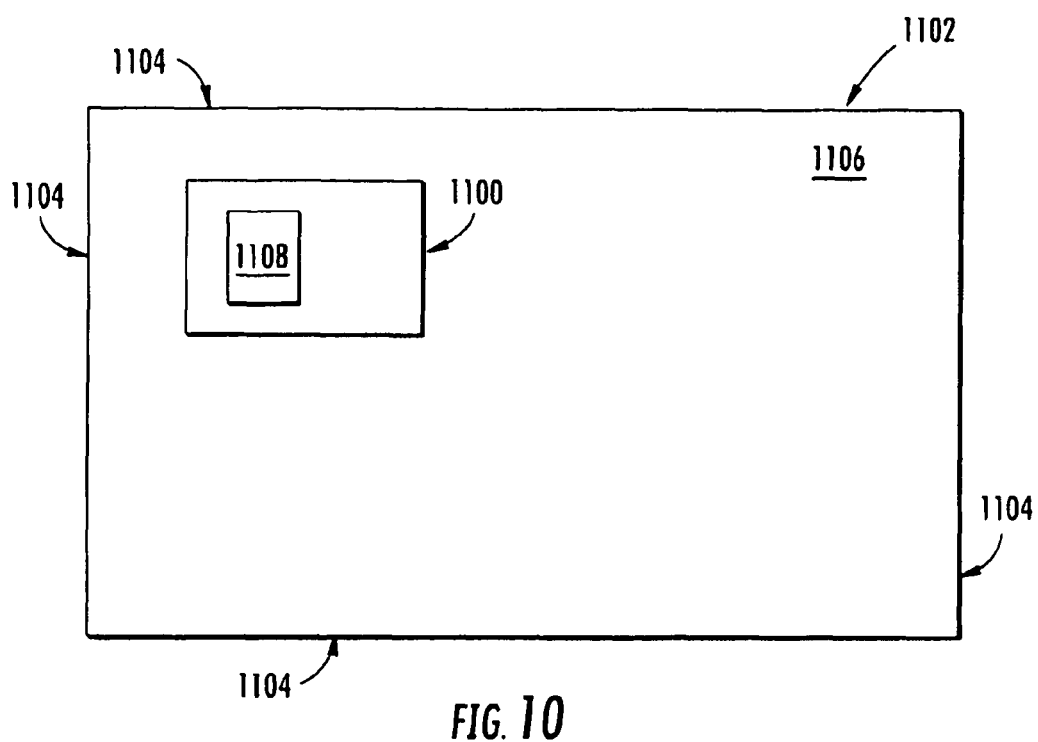
FIG. 10 is a block diagram showing a dosimeter installed in a container.

In some embodiments, containers 508, 510, 512, are secured so that after scanning the container, a breach through any of its six sides will be detected (e.g. using a sensor grid embedded in the composite panels of the containers of the type described in U.S. Patent Publication No. 20070229285 filed Oct. 4, 2007 and entitled "Secure panel with remotely controlled embedded devices"). In such a case, it would be feasible to scan containers at some distance from a dock where the containers are loaded onto a ship bound for the United States. As shown in FIG. 10, because containers 508, 510, and 512 can be scanned some distance from the dock, it is feasible to provide numerous scanning lanes for container scanning. In typical settings, a great number of such lanes might not be feasible at dockside, where space is limited. Because the need for expensive high power scanners 506 is limited, numerous scanning lanes having low and medium power scanners 502, 504 may be provided at a relatively low cost.

Further, as described above, analysis of the presence or absence of dense metal is very simple and requires very little data and very little data analysis. Consequently, low and medium power scanners 502, 504 (and, in some embodiments, even high power scanners 506) may be automated and/or remotely managed. For example, scanners 502, 504, and 506 may be automated using a system analogous to the familiar toll booth automation systems used on highways. Automated scanning reduces or eliminates the need for on-site operators. This will reduce costs and security risks. For example, it will not be necessary to place trust in an on-site operator. This will be a significant advantage in the maritime shipping environment, which is, unfortunately notoriously corrupt in certain venues.

Dosimeter

Figure 11:
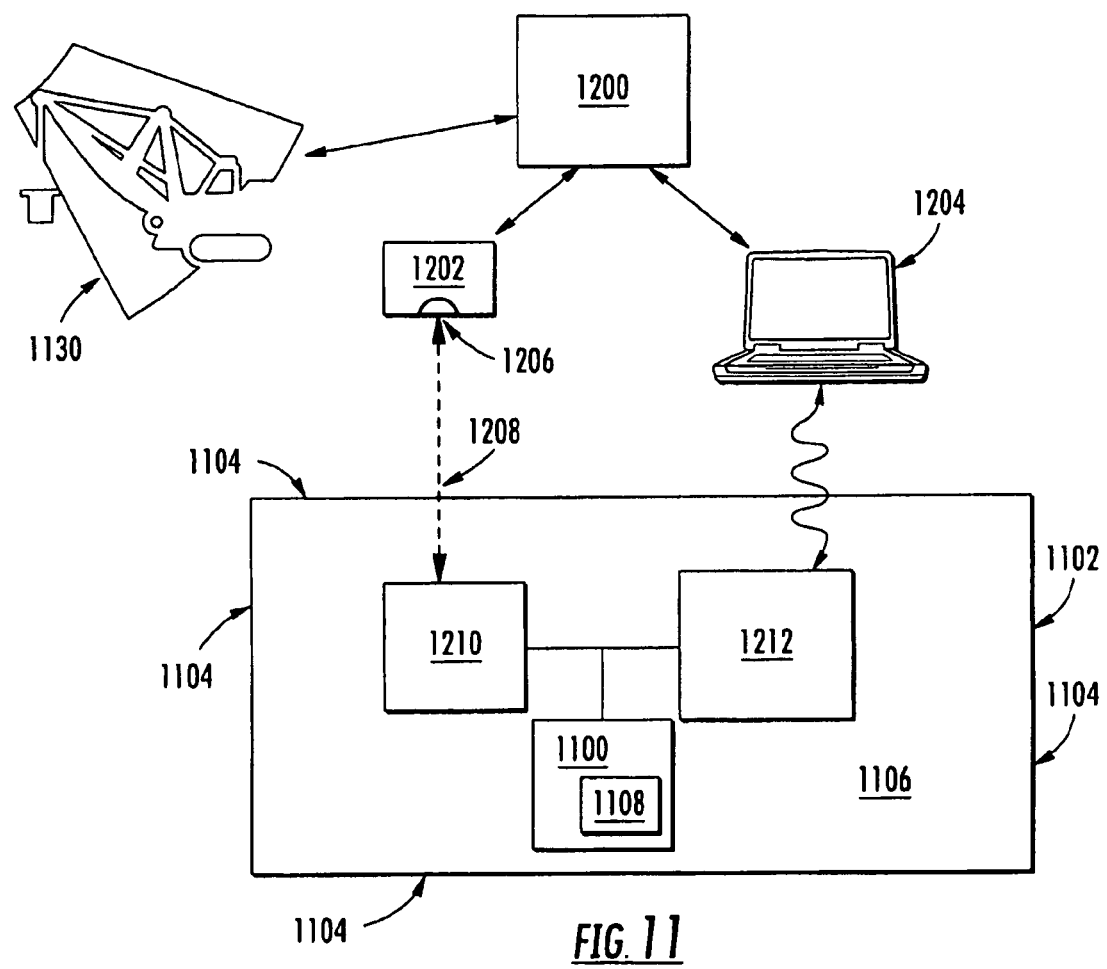
FIG. 11 illustrates a scanning system for use with a dosimeter installed in a container.

Referring to FIG. 11, dosimeter 1100 is positioned inside of container 1102. Container 1102 has exterior walls 1104 defining an interior volume 1106. Exterior walls 1104 may be metal (e.g. steel), composite, or some combination thereof (e.g. composite panels on a steel frame or steel panels with embedded composite plugs). Interior volume 1106 may be sealed air-tight, such that air does not circulate between the exterior environment and the interior volume.

Dosimeter 1100 includes a boron element 1108 capable of measuring the level of radon gas and the neutron level within interior volume 1106. For example, dosimeter 1100 may be a commercial off-the-shelf radon detector. In some embodiments, such an off-the-shelf detector may be made more sensitive by modifying boron element 1108, using techniques known in the art.

As noted above, detection of radon and neutrons is a good indicator of fissile material. Substances that do not contain fissile material will typically not produce radon and neutrons.

When interior volume 1106 of container 1102 is sealed such that the air volume does not circulate, if dosimeter senses less than a threshold number of neutrons and a threshold radon level over a period of time, the probability that the container contains a nuclear weapon approaches zero. The threshold levels and time periods can be easily determined based on measured background neutron and radon levels for a given container type and/or known neutron and radon emission rates for fissile material.

In some embodiments, dosimeter 1100 can communicate with devices external to container 1102. For example, referring to FIG. 12, remote controller 1200 is in communication (e.g. over an Internet connection) with scanner 1202 and receiver unit 1204 (e.g. a computer) located in proximity to scanner 1202. Scanner 1202 includes beam emitter 1206 which directs a radiation beam 1208 (e.g. an x-ray beam) through panel 1104 onto beam detector element 1210, which is in communication with dosimeter 1100. Scanner 1202 receives a message from remote control unit 1200 and operates to modulate the message onto beam 1208 emitted. Detector 1210 detects beam 1110 and demodulates the message. In response to the message, dosimeter 1100 outputs information indicating whether fissile material has been detected inside container 1102. This information is sent to transmitter 1212 which transmits a response message based on the demodulated message and the information output by dosimeter 1100. The response signal may be sent using a non-directed signal, for example using a radio broadcast or other wireless transmission. As shown, the response message is transmitted over an antenna to a Bluetooth receiver in receiver unit 1204. Receiver unit 1204 then passes the message to remote control unit 1200, thereby providing remote monitoring of container 1102 for fissile material. In some embodiments, beam 1208 is directed into interior volume 1106 through a portion of panels 1104 composed of a material having relatively high transmissivity to the radiation beam (e.g. a composite material). This allows emitter 1206 to be a relatively low powered source, e.g. a low voltage (200 kV or less) x-ray source or a cobalt-60 x-ray source.

Note that the above described arrangement provides a closed loop so that a remote monitor can be assured of the position of a particular container while communicating with it. The scan beam 1208 is a directed beam, which can be used to assure that the container is located in a particular place, whereas the communication link between transmitter 1212 and receiver 1204, e.g. using Bluetooth, is a non-directed wave that will only locate a container within the Bluetooth range.

This capability of using a communication path consisting of both a directed beam and a non-directed Bluetooth wave would allow a remote monitor to assure that the container with which it was communicating was the container actually being scanned. The ability to assure that a particular container is in front of the scanner is important to avoid various ploys that might be attempted by a clever adversary to avoid the container scanning process. In some embodiments, scanner 1202 and receiver 1204 may be positioned on or in proximity to loading crane 1130. This allows for a positive identification of container 1102 and a determination that it does not contain a nuclear device immediately prior to loading onto a transport (e.g. a maritime container ship, train, truck, etc.). Of course, identification and determination may additionally or alternatively be made during or after loading and/or before during or after off-loading.

Figure 12:
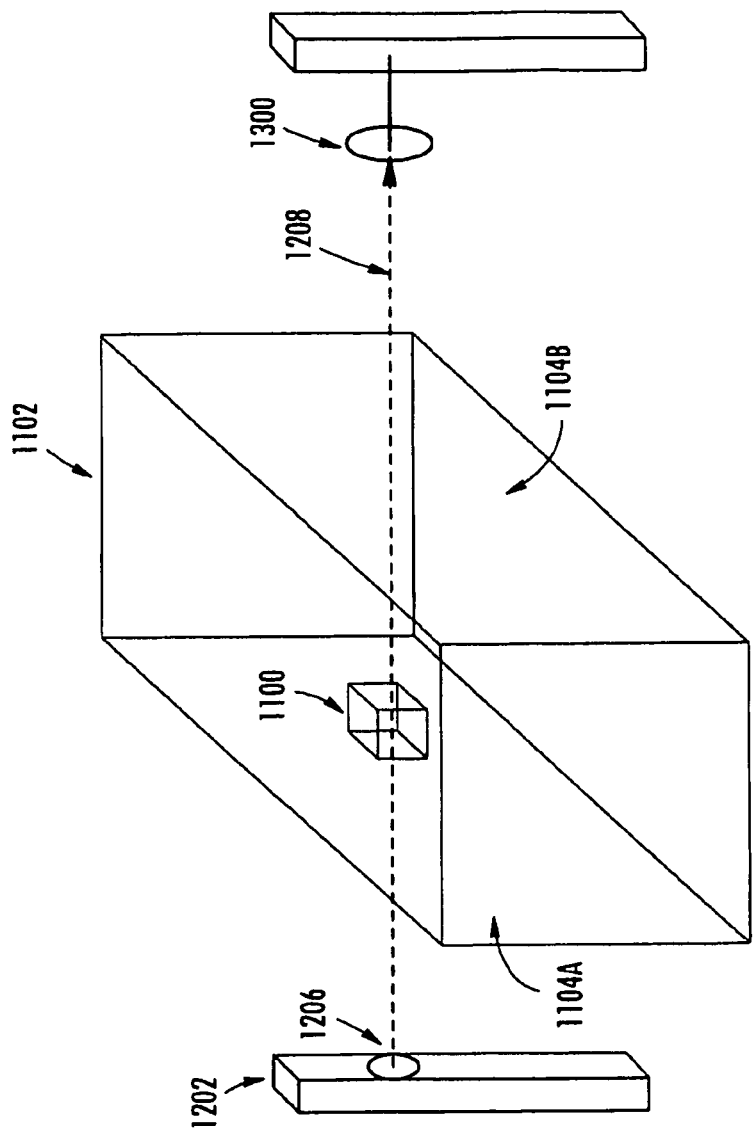
FIG. 12 a perspective view of a dosimeter installed in a container and a scanning system.

Referring to FIG. 12, in some embodiments, scanner 1202 emits scan beam 1208 from emitter 1206 which is directed along a path which enters container 1102 through a first panel 1104A, passes through dosimeter 1100, exits container 1102 through a second panel 1104B and is detected by detector 1300. As described above, a query message (e.g. from a remote control unit) is modulated onto beam 1208. Beam 1208 is detected by dosimeter 1100 (e.g. either directly using boron element 1108, or using a separate detector unit), and the message demodulated. In response to the demodulated query, dosimeter 1100 outputs information indicating whether fissile material has been detected inside container 1102. This information is included in a response message modulated onto beam 1208 by a modulator integral with or in communication with dosimeter 1100. Detector 1300 detects beam 1208 after it exits container 1100, and demodulates the response message. Detector 1300 may communicate the response message to a remote controller (not shown), e.g., using an Internet link.

Composite Plugs

Figure 13:
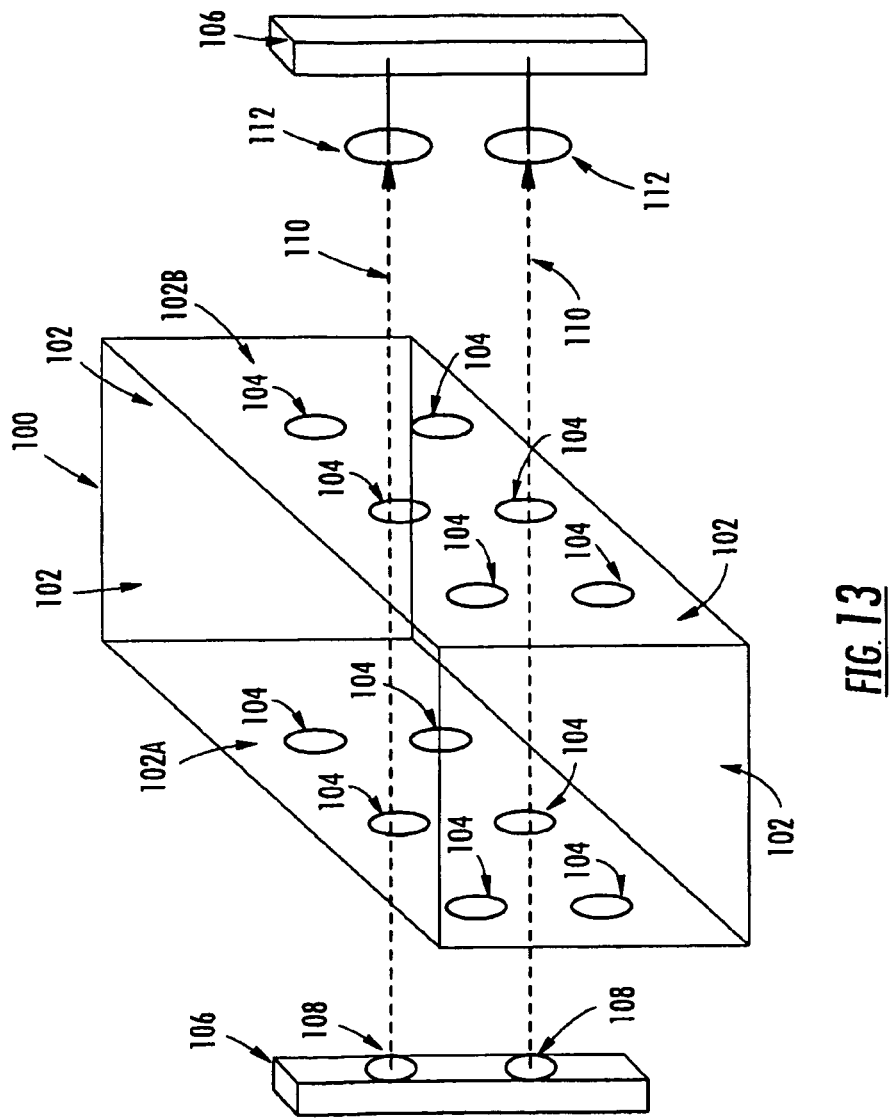
FIG. 13 shows a perspective view of a container with composite plugs and a scanning system.

Referring to FIG. 13, container 100 is constructed from steel panels 102, 102A, 102B enclosing an interior volume. Plugs 104 of composite material are embedded in side panels 102A and 102B. The composite plugs 104 have relatively high transmissivity to x-ray radiation while steel panels 102, 102A, 102B have relatively low transmissivity. Accordingly, composite plugs 104 act as x-ray "windows" into the interior volume of container 100.

In the illustrated embodiment, where container 100 is a rectangular parallelpiped, scan beams 110 and their respective emitters 108 and detectors 112 are along axes parallel to one of the sidewalls of container 100. In some embodiments, beams 110 and their respective emitters 108 and detectors 112 may be angularly offset with respect to the container sidewall.

Each plug 104 in side panel 102A is located directly opposite to a plug 104 in side panel 102B. Scanner 106 includes directed x-ray beam emitters 108. The emitters 108 each direct scan beams 110 through one plug 104 in sidewall 102A, then through the interior volume of container 100, then through another plug 104 on the opposite sidewall 102B and on to a detector 112 outside on the other side of the container. The detector signals are transmitted to a remote control unit (not shown), and analyzed to determine the material properties of cargo (not shown) loaded in the interior volume of container 100. For example, the detector signals can be analyzed to determine the presence of metals, fissile material, medium density material (e.g. electronic components), etc. Because scan beams 110 need not penetrate the steel portions of side panels 102A, 102B, emitters 108 may be inexpensive, relatively low power beam emitters. For example, in various embodiments, emitters 108 may be low-voltage x-ray source (e.g. a 200 kV x-ray source) or a cobalt-60 x-ray source.

Container 100 can be moved relative to scanner 106 and detectors 112 (e.g. by driving a truck hauling the container past scanner 106) to allow scan beams 110 to be directed through additional pairs of plugs to allow other areas of the interior volume to be scanned. Alternatively, scanner 108 and detector 112 may be moved along the length of the container to access different pairs of plugs 104. In some embodiments, container 10 and scanner 108 and detectors 110 remain stationary during each scan event. For some applications, e.g. for detecting the presence of nuclear weapons, a sufficient quantity of plugs 104 are provided such that that no matter where the weapon was located within the interior, it could be detected by the scan.

Composite plugs 104 may be inserted into panels 102A, 102B by an operation after the steel panel is stamped, or the operation could be integrated into the stamping operation.

In some embodiments, composite plugs 104 have considerable structural strength so that insertion of a plug would not degrade the structural strength of the steel container.

In some embodiments, plugs 104 could be retrofitted to an existing steel container 100 at a modest cost so as to overcome the significant cost disadvantage of all—composite containers.

Figure 14:
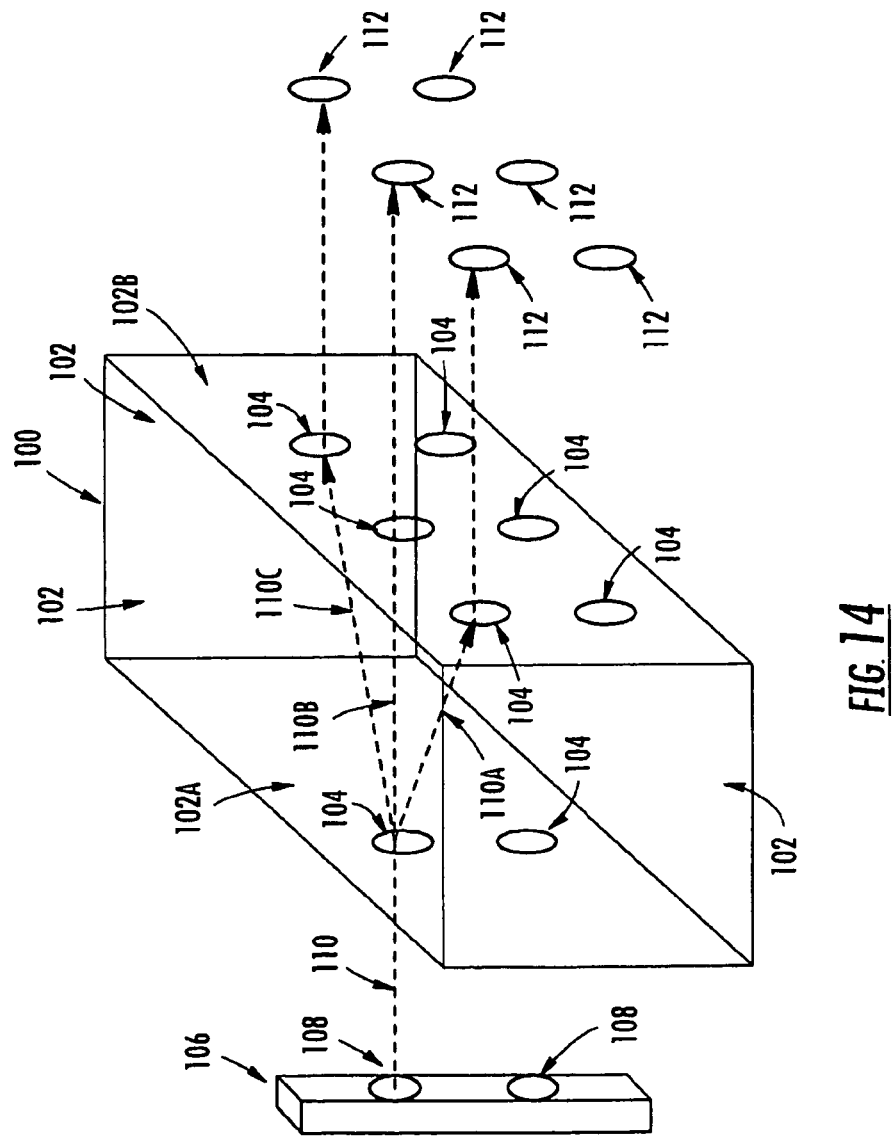
FIG. 14 shows a perspective view of a container with composite plugs and a scanning system.

Referring to FIG. 14, in some embodiments, one or more of the composite plugs 104 located in side panel 102A contain a lens or scattering element that directs or scatter the incoming beam 110 to form beams 110A, 110B, and 110C, which travel along different paths through the interior volume of container 100. Each of beams 110A, 110B, and 110C exit the container through a different composite plug 104 in side panel 102B and is detected by a detector 112. Thus, a given input beam 110 generates beams 110A, 110B, and 110C which would be detectable by the detector 112 immediately opposite and by detectors 112 the left and right (and/or above and below depending on the type of lens or scattering element). Accordingly, each scanning beam emitted from scanner 108 is able to scan a larger portion of the interior volume of container 100 than in the configuration shown in FIG. 14.

In some embodiments, several inexpensive beam emitters 108 might be arrayed vertically. Opposite these beams, several detectors 112 would be arrayed both horizontally and vertically. In some embodiments beam sources 108 are pulsed sequentially so that the detected pulse could be measured separately for each beam pulse. In some such embodiments, it might be necessary to stop container 100 and scan it while it was stationary rather than driving the container through a scanner. In some embodiments, indicial markers or position detectors may be used to ensure proper alignment of plugs 104 and scanner 106.

Figure 15:
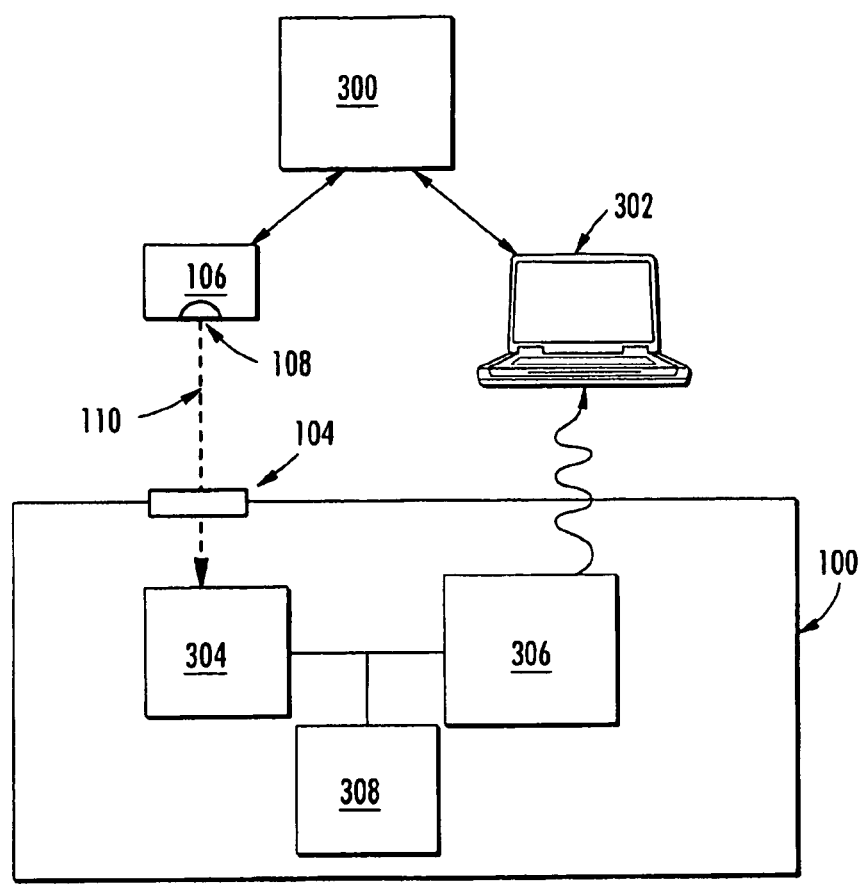
FIG. 15 is a block diagram of a remotely controlled scanning system and container with composite plug.

Referring to FIG. 15, remote controller 300 is in communication (e.g. over an Internet connection) with scanner 106 and computer 302 located in proximity to scanner 106. Scanner 106 operates to modulate a message on beam 110 emitted by emitter 108. Beam 110 is directed through composite plug 104 into the interior volume of container 100. Detector/demodulator 304 positioned within container 100 detects beam 110 and demodulates the message. Transmitter 306 transmits a response message based on the demodulate message, e.g. over an antenna to a Bluetooth receiver in computer 302. In some embodiments, other types of transmission can be used including radio, wireless, etc. The above described arrangement provides a round trip loop so that a remote monitor could be assured of the position of a particular container while communicating with it.

In some embodiments, a dosimeter 308 is located inside the container. Dosimeter 308 detects the presence of even shielded fissile material. Dosimeter 308 is in communication with detector/demodulator 304 and transmitter 306. A query message is sent from remote monitor 300 via modulated beam 110 through plug 104 to detector/demodulator 304. In response to this massage, information indicating the presence or absence of fissile material is sent from dosimeter 308 via transmitter 306 to computer 302 and on to remote monitor 300. In some such embodiments, a single composite plug could be inserted into the container allowing communication with dosimeter 308 and reducing or eliminating the need to actually scan for metal.

Figure 16:
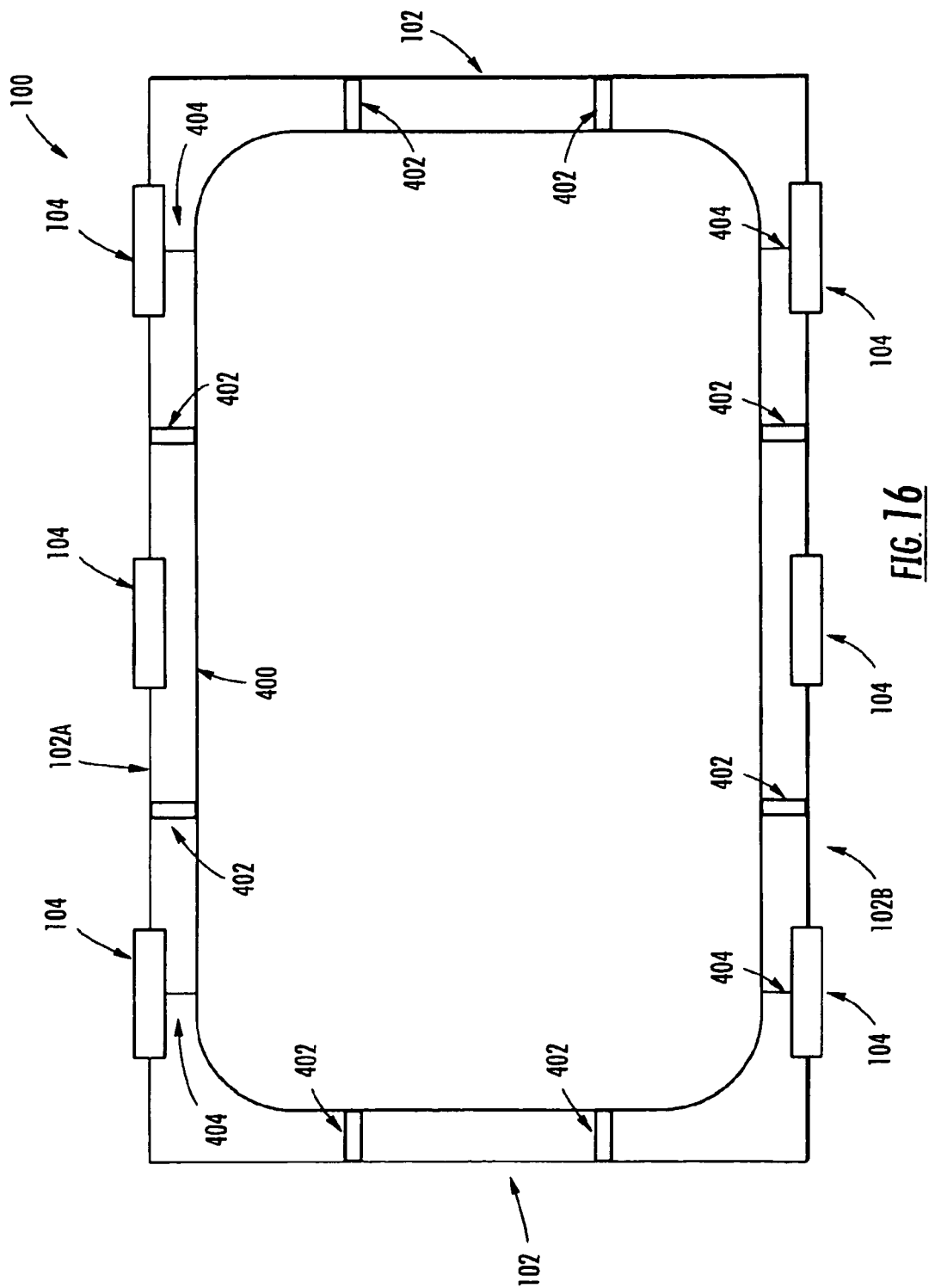
FIG. 16 shows a top down view of a container with composite plugs and a fabric liner containing intrusion detection grids.

Referring to FIG. 16, wall fabric liner 400 is installed inside container 100 to enclose substantially all of the interior volume of the container. Wall fabric 400 contains grids (e.g. electrical or optical grids) that produce an alarm if an intrusion is sensed (e.g. in response to a breach in a portion in one of the grids). For example, fabric liner 200 may include dispersed, interconnected electronic components integrally attached to the liner. Each electronic component of the plurality of components may be in communication with a remotely accessible interface and includes a memory for storing a respective sub-division of at least one numeric value. The numeric values can be inserted, altered, or deleted remotely through the remotely accessible interface. Upon detection of an attempted breach of or tamper with fiber liner 400 one or more of the stored sub-divisions are selectively destroyed. Detection of an attempted breach or tamper is remotely observable upon inspection of a previously stored numeric value, subsequently altered in response to detection of a breach of the secured asset.

Fabric liner 400 has tabs 402 that stick to the panels 102, 102A, 102B for easy installation. In some embodiments, the fabric used along the floor of the container has increased durability, since, in typical applications, fork lifts would need to be driven over it.

Composite plugs 104 contain connections for insertion of leads 404 from the fabric. These plugs 104 having connections may be installed at or near the corners of a sidewall of container 100.

When the fabric liner 400 is installed and the connections were made with plugs 104, a scanner could be used to query fabric liner 400 (e.g. using a closed loop modulation/demodulation/response scheme of the type described above) to assure that the system was functioning properly. As described above, fabric liner 400 could contain unique embedded identification information so that by scanning through the plugs 104 to communicate with fabric liner 400, a remote monitor could assure that the plugs were connecting to one another through the fabric rather than through some wiring device that avoided the fabric liner 400. Such a configuration allows an inexpensive intrusion detection system to be installed in steel container 100 and permits a remote check-out that the system was providing the required coverage.

In some embodiments, fabric liner 400 is manufactured as an integrated electrical unit so that a reduced number of wiring connections would need to be made upon installation. In some embodiments, the fabric liner 400 is capable of being checked out before installation, so that the time spent installing a defective fabric can be avoided.

Composite Panels with Intrusion Detection

Figure 17:
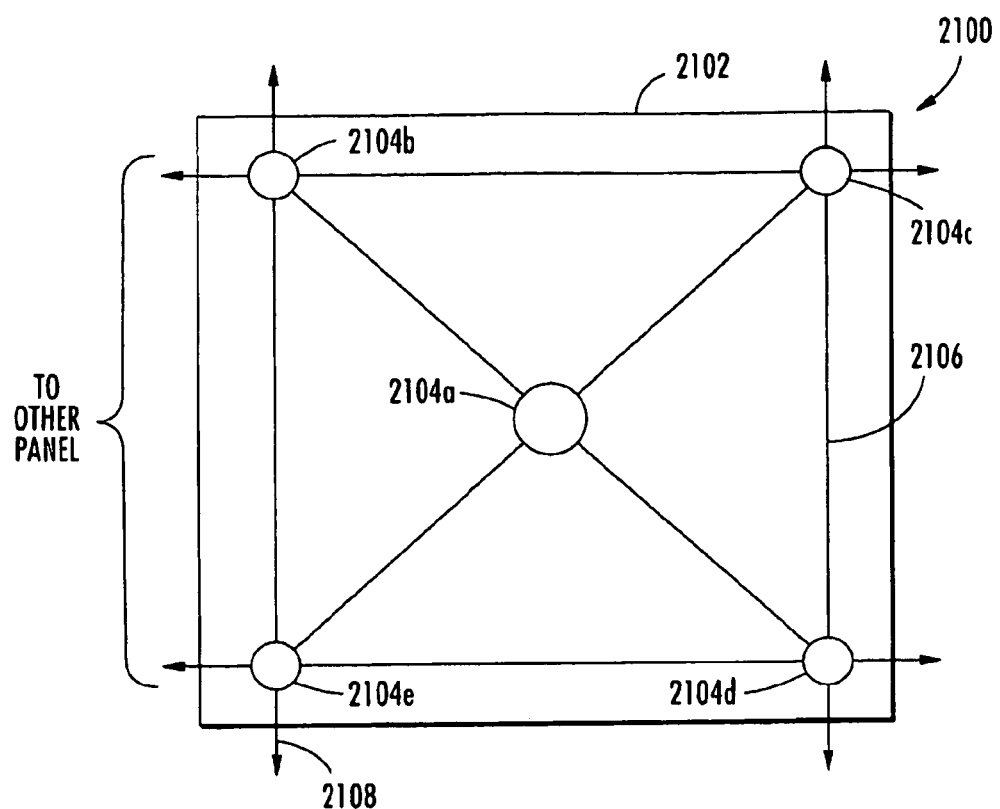
FIG. 17 is a schematic diagram illustrating an exemplary structural member including dispersed, interconnected electronic components.
Figure 18:
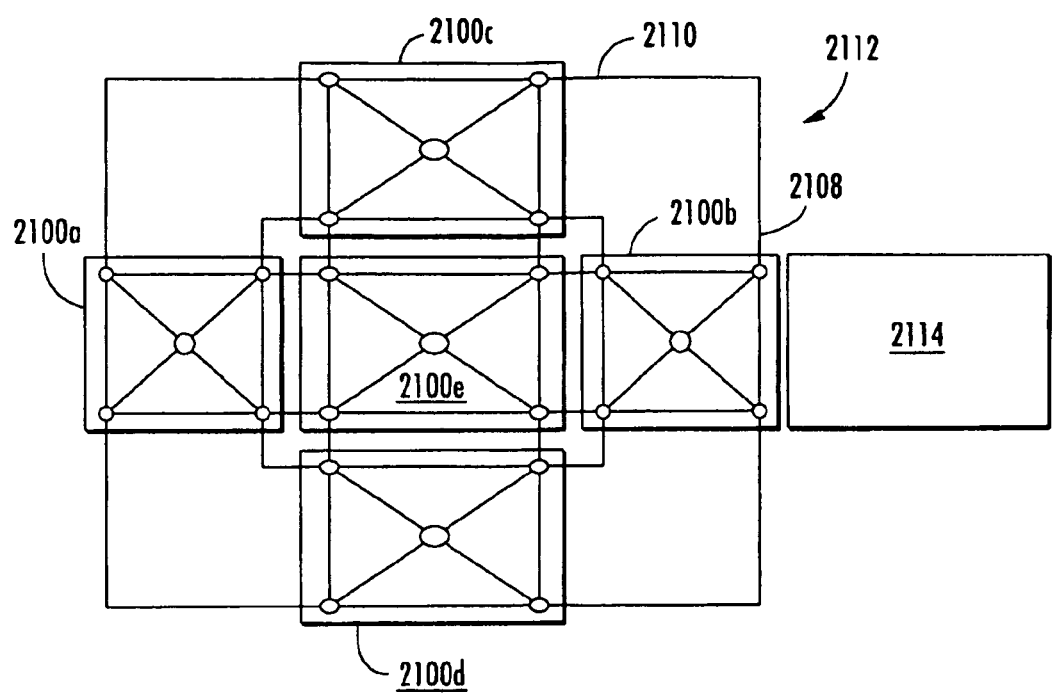
FIG. 18 is a schematic diagram illustrating interconnection of multiple structural members of FIG. 17.

FIG. 17 is a schematic diagram illustrating an exemplary structural member 2100 including a panel 2102. The structural member 2100 includes multiple electronic components 2104a, 2104b, 2104c, 2104d, 2104e (generally 104) distributed throughout the structural member 2100 and attached to the panel 2102. Each of the electronic components 2104 is coupled to one or more other electronic components 2104 via electrical connections 2106. Preferably, each of the electronic components 2104 is coupled to more than one of the other electronic components 2104 to preserve networked interconnection of all active electronic components 2104 in the event of one of the electronic component 2104 failing. In some embodiments, the structural member 2100 includes one or more interconnects 2108, each in communication with a respective one of the electronic components 2104 and adapted for interconnection with similar electronic components 104 of an adjacent structural member (FIG. 18). At least some of the electronic components 104 include a local memory for storing a respective portion, or sub-division of a numeric value as will be described in more detail below.

FIG. 18 is a schematic diagram illustrating electrical interconnection of multiple structural members 100 as may be used for a rectangular container asset, such as a shipping container. Illustrated are left and right panels 2100a, 2100b, front, rear, and top panels 2100c, 2100d, 2100e, and a bottom panel 2114. In this exemplary embodiment, each of the left, right, front, rear, and top panels 2100a, 2100b, 2100c, 2100d, 2100e (generally) are similar to the structural member 2100 of FIG. 17. One or more jumpers 2110 are provided to join together corresponding electrical interconnects 2108 of adjacent panels 2100. Thus, a shipping container 2112 configured as shown provides a single dispersed, interconnected network of electronic devices 2104.

Figure 19:
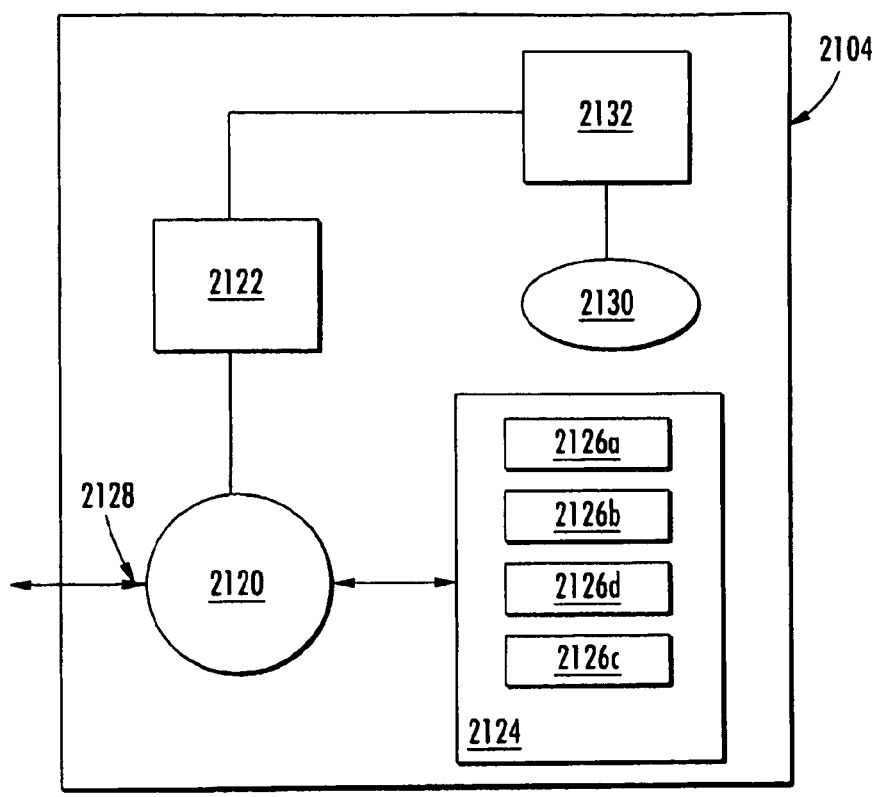
FIG. 19 is a block diagram illustrating in more detail an exemplary one of the electronic components of FIG. 17.

As shown in more detail in FIG. 19, an exemplary embodiment of one of the electronic components 2104 includes a microprocessor 2120, a local power source 2122, and a local memory 2124. The microprocessor 2120, powered by the local power source 2122, includes a communications interface 2128 that can be used for communicating with other electronic components 2104. The microprocessor 2120 is also in electrical communication with the local memory 2124 that can be used to store one or more numeric values in the form of digital words. As described below, these values can include private and public portions of an ID value 2126a, 2126b (generally 2126) and private and public portions of a certificate value 2127a, 2127b (generally 2127). ID values 2126 can be preloaded during construction of the structural member 100; whereas, the certificate values 2127 can be loaded and re-loaded in the field, as required.

In operation, the microprocessor 2120 receives one or more of the numeric values 2126, 2127 over the communications interface 2128 and stores (i.e., writes) them in the local memory 2124. In response to a remote inquiry as to the stored values, the microprocessor 2120 reads the requested values from local memory 2124 and forwards them to the requester via the communications interface 2128.

Some of the electronic components 2104 are configured to receive an input from an external sensor. Sensors can be configured detect a potential breach of or attempted unauthorized access to a secured asset. For example, a sensor may include a photo detector to detect a change in ambient light as might occur during unauthorized opening of a shipping container. Other sensors are configured to detect a physical breach of a container through one or more embedded sensors that might be compromised if a panel of the container was breached. Still other sensors can include thermal sensors, acoustic sensors, shock and vibration sensors, tipping sensors, etc.

As shown, at least some of the electronic components 2104 can include a high-energy device 2130 located proximate to the local memory 2124. The high-energy device 2130 can include an incendiary device or a small explosive charge (i.e., squib). Upon activation, the high-energy device 130 physically destroys at least a significant portion of the local memory 2124 making it impossible for an adversary to reconstruct data that may have been stored therein. The high-energy device 2130 receives an input signal from a tamper sensor 2132. The tamper sensor 2132 may be the same sensor providing input to the microprocessor 2120, or a separate sensor 2132 as shown. In some embodiments, two sensors are provided, such that a first sensor used to delete memory in response to a sensed event and a second sensor is used to physically destroy memory in response to a sensed event.

In some embodiments, very low power processors 2120 are provided in substrate layers. Very low power, very small processors are currently commercially available, such as the model no. MSP430 series available from Texas Instruments of Dallas, Tex., and the model PIC F10 series, available from Microchip Technology, Inc of Chandler, Ariz., each of which is suitable for being embedded in composite materials in accordance with the invention. Such very low power processors 2120 are designed to run with a power source 2122, such as a permanent battery, for a period of up to ten years, with present device costs starting at about $0.49, and a current size that is approximately one-tenth the size of a penny (4 mm by 4 mm). The size and the cost per unit will probably decrease significantly in the future.

In some embodiments, the structural member is formed of a composite material within which the processors 120 are mounted on a substrate layer. Thus, the composite material replaces standard PVC board on which electronic devices are commonly mounted. To achieve this mounting, the processors are mounted on a substrate fabric, such as a glass fiber, or other type of layer, to allow a resin to flow through the substrate and bond so as to prevent delamination of the resulting composite material. Using very low power processors 2120, applications can run for up to ten years from a single lithium battery 2122.

One or more or any part thereof of the control, sensing, detection, scanning or other techniques described above can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The technique can also be implemented as a computer-readable storage medium, configured with a computer program, where the storage medium so configured causes a computer to operate in a specific and predefined manner to perform the functions described herein.

Although in the examples described above container 100 was composed of rectangular panels (e.g. corrugated rectangular panels), it is to be understood that in various embodiments one or more of the panels may be curved and/or have any suitable shape. For example, a tank type container may be made up of a cylindrical panel and two circular end cap panels. Similarly, plugs 104 may be of any suitable shape including, for example square, rectangular, circular, oval, polygonal, etc. The plugs may be arranged in any suitable pattern on any number of the panels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for scanning and securing a container comprising a plurality of at least partially composite panels defining an interior volume, said system comprising:
   a remote control unit;
   a receiver unit in communication with said remote control unit;
   a scanner comprising a beam generator adapted to emit a directed radiation scan beam, said scanner in communication with said remote control unit;
   a first beam detector element positioned within the interior volume of the container adapted to detect said scan beam;
   a security element positioned within the interior volume of the container adapted to detect an intrusion into the container;

an identification element positioned within the interior volume of the container, communicatively coupled to the first beam detector element and adapted to store identification information as stored identification information indicative of the identity of the container; and a transmitter element positioned within the interior volume of the container and communicatively coupled to the identification element, wherein the beam generator is adapted to direct the scan beam along a path into the interior volume of the container through a first one of the plurality of at least partially composite panels, across a portion of the interior volume and onto the first beam detector element resulting in a first detected scan beam, wherein the scanner is adapted to determine material property information indicative of material properties of contents of the interior volume based on the first detected scan beam, wherein the scanner is adapted to modulate a query message from the remote control unit onto the scan beam, and the first beam detector element is adapted to demodulate the message from within the interior volume of the container, resulting in a demodulated query message, wherein the identification element is adapted to produce a response message from within the interior volume of the container based on the demodulated query message and the stored identification information without breaking a seal of the container when sealed, wherein the transmitter element is adapted to transmit the response message to the receiver unit.

2. The system of claim 1, wherein the remote control unit is adapted to receive the response message from the receiver unit and verify the identity of the container based on the response message.

3. The system of claim 2, wherein the query message comprises a number generated randomly by the remote control unit.

4. The system of claim 2, wherein: the remote control unit is adapted to determine a presence or absence of a nuclear device within the container based on the material property information and, if no nuclear device is determined to be present, store a certificate associated with the identity of the container.

5. The system of claim 4, further comprising a second beam detector element, the scan beam detected along a path into the interior volume of the container through one of the plurality of at least partially composite panels, across a portion of the interior volume, through a second one of the plurality of at least partially composite panels and onto the second beam detector element resulting in a second detected scan beam, wherein the scanner is located in proximity to the receiver unit.

6. The system of claim 5, further comprising:

a dosimeter positioned within the interior volume of the container, said dosimeter comprising:

a radon detection element adapted to detect a radon level for the interior volume; and a neutron detection element adapted to detect a neutron level for the interior volume, wherein the dosimeter is adapted to measure the radon level and neutron level, resulting in a measured radon level and a measured neutron level, for a period of time, compare the measured radon level to a first threshold and compare the measured neutron level to a second threshold, resulting in further comparisons, determine dosimeter information indicative of the presence or absence of fissile material within the interior volume based on the further comparisons, and communicate said dosimeter information to one of the identification element, the transmitter element, the first beam detector element, the second beam detector element, or a combination thereof.

7. The system of claim 5, wherein the identification element is adapted to destroy a portion of the stored identification information in response to an intrusion detected by the security element, wherein the first one of the plurality of at least partially composite panels comprises a first plurality of plugs of composite material positioned within apertures through a first metal wall, wherein the second one of the plurality of at least partially composite panels comprises a second plurality of plugs of composite material positioned within apertures through a second metal wall, wherein the path into the interior volume extends through a first plug of the first plurality of plugs and a second plug of the second plurality of plugs, a separation distance between the first and second plugs spanning the interior volume of the container.

8. The system of claim 6, wherein the identification element is adapted to destroy a portion of the stored identification information in response to a detection of fissile material within the container by the dosimeter.

9. The system of claim 5, further comprising a verification unit comprising:

a verification scanner unit comprising a beam generator adapted to emit a directed radiation verification scan beam; and a verification receiver unit located in proximity to the verification scanner unit, wherein the verification scanner unit is adapted to modulate a verification query message received from the remote control unit onto the verification scan beam, and direct the verification scan beam to the first beam detector element located within the container, wherein the first beam detector element is adapted to detect the verification scan beam and demodulate the verification query message, resulting in a demodulated verification query message, wherein the identification element is adapted to produce a verification response message based on the demodulated verification query message and the stored identification information, wherein the transmitter element is adapted to transmit a verification response message to the receiver unit, wherein the remote control unit is adapted to receive the verification response message from the receiver unit and verify the identity of the container based on the verification response message.

10. The system of claim 9, further comprising a loading device in communication with the remote control unit and located in proximity to the verification unit, said loading device adapted to selectively load the container onto a transport based on the verification of the certificate associated with the identity of the container, and wherein the container comprises a maritime shipping container.

11. The system of claim 5, wherein the identification element stores private identification information which cannot be transmitted to any scanner or receiver located outside the container.

12. The system of claim 5, wherein the security element comprises a sensor grid embedded in a partially composite panel of the plurality of at least partially composite panels.

13. The system of claim 5, wherein the container comprises a sealed container having a substantially air tight interior volume, and the security element comprises a radon detector unit adapted to:

detect a change in radon level, resulting in a detected change, in the interior volume of the sealed container;

compare the detected change to an expected change value based on a four day half-life of radon; and indicate the presence or absence of an intrusion into the sealed container based on comparing of the detected change to the expected change value.

14. The system of claim 5, comprising:

a first scanner adapted to produce a relatively low energy directed radiation scan beam;

a second scanner adapted to produce a relatively high energy directed radiation scan beam; and a sorting module adapted to direct containers represented to contain substantially no metal material to the first scanner and to direct containers represented to contain metal material to the second scanner, wherein the first scanner is adapted to receive a container represented to contain substantially no metal material from the sorting module, and to scan said container to verify that substantially no metal material is present inside the container, and wherein the second scanner is adapted to receive a container represented to contain metal material from the sorting module, and to scan said container to detect the presence of a nuclear device.

15. The system of claim 14, further comprising a third scanner adapted to produce a relatively moderate energy directed radiation scan beam, wherein the sorting module is adapted to direct containers represented to contain metal material having density above a threshold value to the second scanner, and to direct containers represented to contain metal material consisting only of metal material having a density below the threshold value to the third scanner, and wherein the third scanner is adapted to receive a container represented to contain metal material consisting only of metal material having a density below the threshold value from the sorting module, and to scan said container to verify that substantially no material is present inside the container having a density above the threshold value.

16. The system of claim 5, wherein the scanner and the receiver unit each comprise an information security element adapted to prevent access to data stored in said scanner and said receiver unit by an entity other than the remote control unit.

17. A method for scanning and securing a container comprising a plurality of at least partially composite panels defining an interior volume, said method comprising:

storing unique identification information in an identification element within the interior volume of the container;

sealing the container;

monitoring the container for intrusion;

detecting from within the interior volume of the container, a scan beam originating externally from the interior volume of the container, without breaching the seal of the container, remotely identifying the container in response to the detecting of the scan beam based on the unique identity information;

without breaching the seal of the container; scanning said identified container to determine a presence or absence of a nuclear weapon in the interior volume; and if the scan determines no nuclear weapon is present, storing certificate information associated with the identity of the container in a remote monitor unit.

18. The method of claim 17, wherein storing unique identification information in an identification element within container comprises:

at a secure trusted location, providing identification information to be stored in the identification element positioned within the container, said identification information comprising a public ID portion and a corresponding private ID portion, and storing a copy of the public ID portion and the private ID portion in the remote monitor unit.

19. The method of claim 18, wherein remotely identifying the container comprises:

at a first location, providing the remote monitor unit;

at a second location providing a scanning unit in communication with said remote monitor unit, said scanning unit adapted to communicate with the identification element within the container without breaching the seal of said container;

generating query information at the remote monitor unit;

transmitting the query information to the remote scanning unit;

without breaching the seal of the container transmitting the query information from the remote monitor to the identification element;

at the identification element, using a hash algorithm to hash the query information with the private ID portion to produce response hash information;

in response to said query information, without breaching the seal of the container, transmitting the public ID stored in the identification element and the response hash information to the scanning unit;

transmitting the public ID stored in the identification element and the response hash information from the scanning unit to the remote monitor unit; and at the remote monitor unit:

identifying the private ID portion corresponding to the public ID portion received from the scanning unit;

using the hash algorithm to hash the query information with the private ID portion to produce verification hash information; and comparing the response hash information to the verification hash information to verify the identity of the container.

20. The method of claim 19, further comprising, in response to an intrusion of the container, modifying or destroying at least a portion of the identification information.

21. The method of claim 17, wherein the scanning comprises:

generating a directed radiation scan beam having a beam energy sufficient to penetrate through a composite panel of the plurality of at least partially composite panels but insufficient to penetrate through bulk metal material;

directing the scan beam, resulting in a detected scan beam, along a path into the interior volume of the container through one of the plurality of at least partially composite panels, across a portion of the interior volume, out of the interior volume through another one of the plurality of at least partially composite panels, and onto a scan beam detector;

detecting the scan beam with the scan beam detector, and analyzing the detected scan beam to determine information indicative of material properties of contents of the interior volume based on the detected scan beam; and outputting the information indicative of the material properties of contents of the interior volume.

22. The method of claim 17, further comprising
using a dosimeter positioned within the container to measure a radon level and to measure a neutron level in the interior volume over a period of time, resulting in a measured radon level and a measured neutron level;
detecting the presence or absence of fissile material within the interior volume based on the measured radon level and the measured neutron level; and
in response to a detection of fissile material, destroying a portion of the identification information stored in the identification element.

23. The method of claim 17, further comprising:
monitoring the container for an indication of an imminent nuclear explosion, and
in response to a detection of an imminent nuclear explosion, transmitting a message comprising information indicative of the identity of the container.

* * * * *